(12) United States Patent
Backhaus-Ricoult et al.

(10) Patent No.: US 11,447,422 B2
(45) Date of Patent: Sep. 20, 2022

(54) BATCH COMPOSITIONS COMPRISING SPHEROIDAL PRE-REACTED INORGANIC PARTICLES AND SPHEROIDAL PORE-FORMERS AND METHODS OF MANUFACTURE OF HONEYCOMB BODIES THEREFROM

(71) Applicant: CORNING INCORPORATED, Corning, NY (US)

(72) Inventors: Monika Backhaus-Ricoult, Bourron (FR); Catheline Anne L Colard, Ciney (BE); Boris Nikolayevich Tsvetkov, Saint-Petersburg (RU)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/760,145

(22) PCT Filed: Oct. 31, 2018

(86) PCT No.: PCT/US2018/058414
§ 371 (c)(1),
(2) Date: Apr. 29, 2020

(87) PCT Pub. No.: WO2019/089731
PCT Pub. Date: May 9, 2019

(65) Prior Publication Data
US 2020/0255338 A1    Aug. 13, 2020

Related U.S. Application Data

(60) Provisional application No. 62/579,579, filed on Oct. 31, 2017, provisional application No. 62/579,585, filed on Oct. 31, 2017.

(51) Int. Cl.
*C04B 35/195* (2006.01)
*C04B 38/00* (2006.01)
(Continued)

(52) U.S. Cl.
CPC .......... *C04B 35/195* (2013.01); *C04B 35/185* (2013.01); *C04B 35/478* (2013.01);
(Continued)

(58) Field of Classification Search
CPC ... C04B 35/195; C04B 35/185; C04B 35/478; C04B 35/62645; C04B 38/0006;
(Continued)

(56) References Cited

U.S. PATENT DOCUMENTS 4,295,892 A   10/1981  Matsuhisa
4,327,188 A    4/1982  Endo et al.
(Continued)

FOREIGN PATENT DOCUMENTS

CN     1942413 A     4/2007
CN   101053719 A    10/2007
(Continued)

OTHER PUBLICATIONS

Eskin, NA Michael, and Fereidoon Shahidi. "Biochemistry of foods." (2012). Chapter on Starch Granules by Kequan Zhou and Liangli Yu. (Year: 2012).*
(Continued)

*Primary Examiner* — Karl E Group
*Assistant Examiner* — Cameron K Miller
(74) *Attorney, Agent, or Firm* — Daniel J. Greenhalgh

(57) ABSTRACT

A batch composition containing pre-reacted inorganic spheroidal particles and pore-former spheroidal particles. The pre-reacted inorganic spheroidal particles have a particle size distribution wherein 10 μm≤$DI_{50}$≤50 μm, and $DIb$≤2.0, and the pore-former spheroidal particles have a particle size distribution wherein 0.40 $DI_{50}$≤$DP_{50}$≤0.90 $DI_{50}$, and $DPb$≤1.32, wherein $DI_{50}$ is a median particle diameter of the distribution of pre-reacted inorganic spheroidal particles, $DP_{50}$ is a median particle diameter of the pore-former
(Continued)

particle size distribution, DIb is a breadth factor of the pre-reacted particle size distribution of the pre-reacted inorganic spheroidal particles, and DPb is a breadth factor of the pore-former particle size distribution. Also, green honeycomb bodies manufactured from the batch compositions, and methods of manufacturing a honeycomb body using the batch compositions, are provided.

16 Claims, 7 Drawing Sheets

(51) Int. Cl.
*C04B 38/06* (2006.01)
*C04B 35/185* (2006.01)
*C04B 35/478* (2006.01)
*C04B 35/626* (2006.01)

(52) U.S. Cl.
CPC .. *C04B 35/62645* (2013.01); *C04B 35/62655* (2013.01); *C04B 38/0006* (2013.01); *C04B 38/067* (2013.01); *C04B 38/0655* (2013.01); C04B 2235/3234 (2013.01); C04B 2235/3463 (2013.01); C04B 2235/528 (2013.01); C04B 2235/5296 (2013.01); C04B 2235/5436 (2013.01); C04B 2235/5463 (2013.01); C04B 2235/6021 (2013.01); C04B 2235/76 (2013.01)

(58) Field of Classification Search
CPC .............. C04B 38/0655; C04B 38/067; C04B 2235/528; C04B 2235/5296; C04B 2235/5436; C04B 2235/5463; C04B 2235/76
See application file for complete search history.

(56) References Cited

U.S. PATENT DOCUMENTS

| | | |
|---|---|---|
| 4,789,501 A | 12/1988 | Day et al. |
| 5,173,455 A | 12/1992 | Terbot et al. |
| 5,406,058 A | 4/1995 | Lipp |
| 5,545,243 A | 8/1996 | Kotani et al. |
| 5,863,491 A | 1/1999 | Wang |
| 5,976,478 A | 11/1999 | Swanson et al. |
| 6,017,994 A | 1/2000 | Carter et al. |
| 6,027,684 A | 2/2000 | Gheorghiu et al. |
| 6,048,199 A | 4/2000 | Dull et al. |
| 6,080,345 A | 6/2000 | Chalasani et al. |
| 6,089,860 A | 7/2000 | Dull et al. |
| 6,207,101 B1 | 3/2001 | Beall et al. |
| 6,287,509 B1 | 9/2001 | Gheorghiu |
| 6,325,963 B1 | 12/2001 | Dull et al. |
| 6,413,895 B1 | 7/2002 | Merkel |
| 6,551,628 B1 | 4/2003 | Watson et al. |
| 6,589,465 B2 | 7/2003 | Kumazawa et al. |
| 6,620,751 B1 | 9/2003 | Ogunwumi |
| 6,849,181 B2 | 2/2005 | Ogunwumi et al. |
| 6,932,959 B2 | 8/2005 | Sterte et al. |
| 7,166,552 B2 | 1/2007 | Fukuda et al. |
| 7,294,164 B2 | 11/2007 | Merkel |
| 7,381,681 B2 | 6/2008 | Nilsson et al. |
| 7,596,885 B2 | 10/2009 | Adrian et al. |
| 7,727,613 B2 | 6/2010 | Suwabe et al. |
| 7,732,366 B2 | 6/2010 | Ohno et al. |
| 7,754,638 B2 | 7/2010 | Ogunwumi et al. |
| 7,964,262 B2 | 6/2011 | Brocheton et al. |
| 7,976,768 B2 | 7/2011 | Brady et al. |
| 7,981,188 B2 | 7/2011 | Miao et al. |
| 8,038,956 B2 | 10/2011 | Li |
| 8,101,117 B2 | 1/2012 | Addiego et al. |
| 8,114,354 B2 | 2/2012 | Li |
| 8,119,234 B2 | 2/2012 | Backhaus-Ricoult et al. |
| 8,138,108 B2 | 3/2012 | Tepesch et al. |
| 8,187,525 B2 | 5/2012 | Custer et al. |
| 8,298,311 B2 | 10/2012 | Chen et al. |
| 8,394,167 B2 | 3/2013 | Merkel et al. |
| 8,450,227 B2 | 5/2013 | McCauley et al. |
| 8,454,887 B2 | 6/2013 | Likitvanichkul |
| 8,481,900 B2 | 7/2013 | Pitsakis |
| 8,591,287 B2 | 11/2013 | Folmar et al. |
| 8,591,623 B2 | 11/2013 | Beall et al. |
| 8,691,361 B2 | 4/2014 | Okazaki et al. |
| 8,715,807 B2 | 5/2014 | Boussant-Roux et al. |
| 8,729,436 B2 | 5/2014 | Adrian et al. |
| 8,920,705 B2 | 12/2014 | Suzuki et al. |
| 8,974,724 B2 | 3/2015 | Day et al. |
| 9,221,192 B2 | 12/2015 | Beall et al. |
| 9,335,093 B2 | 5/2016 | Feldman et al. |
| 9,376,347 B2 | 6/2016 | Backhaus-Ricoult et al. |
| 9,429,361 B2 | 8/2016 | Harihara et al. |
| 9,441,517 B2 | 9/2016 | Huang et al. |
| 9,452,578 B2 | 9/2016 | Bronfenbrenner et al. |
| 9,623,360 B2 | 4/2017 | Backhaus-Ricoult et al. |
| 9,856,177 B2 | 1/2018 | Miao et al. |
| 9,908,260 B2 | 3/2018 | Backhaus et al. |
| 2001/0033038 A1 | 10/2001 | Sakaguchi et al. |
| 2003/0007990 A1 | 1/2003 | Blankenship et al. |
| 2004/0029707 A1* | 2/2004 | Beall .................. C04B 38/0006 501/119 |
| 2005/0161849 A1 | 7/2005 | Ohno et al. |
| 2005/0191480 A1 | 9/2005 | Tao et al. |
| 2007/0119135 A1* | 5/2007 | Miao .................. B01D 39/2068 55/523 |
| 2008/0047243 A1 | 2/2008 | Beall et al. |
| 2008/0124423 A1 | 5/2008 | Peterson et al. |
| 2008/0124516 A1 | 5/2008 | Noguchi et al. |
| 2008/0125305 A1 | 5/2008 | Day et al. |
| 2008/0237942 A1 | 10/2008 | Takamatsu |
| 2009/0137382 A1 | 5/2009 | Merkel |
| 2009/0140452 A1 | 6/2009 | Derosa et al. |
| 2009/0143219 A1 | 6/2009 | Chou |
| 2009/0143221 A1 | 6/2009 | Ogunwumi et al. |
| 2009/0326279 A1 | 12/2009 | Tonkovich et al. |
| 2010/0237007 A1 | 9/2010 | Merkel et al. |
| 2010/0298114 A1 | 11/2010 | Maki et al. |
| 2010/0317508 A1 | 12/2010 | Maki et al. |
| 2011/0052906 A1 | 3/2011 | Itoi et al. |
| 2011/0077143 A1 | 3/2011 | Tohma et al. |
| 2011/0097582 A1 | 4/2011 | Tohma et al. |
| 2011/0105318 A1 | 5/2011 | Raffy |
| 2011/0121478 A1 | 5/2011 | Beall et al. |
| 2011/0124484 A1 | 5/2011 | Maki et al. |
| 2011/0124486 A1 | 5/2011 | Gallaher et al. |
| 2011/0130276 A1* | 6/2011 | Backhaus-Ricoult ...................... B01D 46/247 502/410 |
| 2011/0152075 A1 | 6/2011 | Raffy et al. |
| 2011/0156323 A1 | 6/2011 | Maki et al. |
| 2011/0236688 A1 | 9/2011 | Suzuki et al. |
| 2011/0248106 A1 | 10/2011 | Maki et al. |
| 2012/0096821 A1 | 4/2012 | Nemoto et al. |
| 2012/0124953 A1 | 5/2012 | Raffy |
| 2012/0134891 A1 | 5/2012 | Boger et al. |
| 2012/0198805 A1 | 8/2012 | Iwasaki et al. |
| 2012/0297830 A1 | 11/2012 | Backhaus-Ricoult et al. |
| 2013/0111862 A1 | 5/2013 | Divens-Dutcher et al. |
| 2013/0310247 A1 | 11/2013 | Linhart et al. |
| 2014/0327186 A1 | 11/2014 | Cutler et al. |
| 2014/0338296 A1* | 11/2014 | Backhaus-Ricoult .... B32B 3/26 55/523 |
| 2014/0342898 A1* | 11/2014 | Backhaus-Ricoult ...................... C04B 35/10 501/80 |
| 2015/0273727 A1 | 10/2015 | Noni et al. |
| 2016/0251249 A1 | 9/2016 | Backhaus-Ricoult et al. |
| 2016/0354760 A1 | 12/2016 | Suchanek |

(56) References Cited

U.S. PATENT DOCUMENTS

| | | | |
|---|---|---|---|
| 2017/0120498 A1 | 5/2017 | Brew et al. | |
| 2017/0304762 A1* | 10/2017 | Okazaki | C04B 35/195 |

FOREIGN PATENT DOCUMENTS

| | | |
|---|---|---|
| CN | 101343174 A | 1/2009 |
| CN | 101343175 A | 1/2009 |
| CN | 101495423 A | 7/2009 |
| CN | 101952222 A | 1/2011 |
| CN | 101970377 A | 2/2011 |
| CN | 101977871 A | 2/2011 |
| CN | 102015576 A | 4/2011 |
| CN | 102015579 A | 4/2011 |
| CN | 102131747 A | 7/2011 |
| CN | 102630184 A | 8/2012 |
| CN | 103003220 A | 3/2013 |
| CN | 104208961 A | 12/2014 |
| CN | 105392756 A | 3/2016 |
| CN | 105408283 A | 3/2016 |
| CN | 105473532 A | 4/2016 |
| EP | 0506475 A2 | 9/1992 |
| EP | 1207143 A2 | 5/2002 |
| EP | 1284943 A1 | 2/2003 |
| EP | 2043964 A1 | 4/2009 |
| EP | 2266932 A1 | 12/2010 |
| EP | 2319816 A1 | 5/2011 |
| EP | 2322492 A1 | 5/2011 |
| EP | 2335797 A1 | 6/2011 |
| EP | 2401242 A1 | 1/2012 |
| EP | 2402295 A1 | 1/2012 |
| EP | 2038236 B1 | 8/2013 |
| EP | 2999680 A2 | 3/2016 |
| EP | 3026034 A1 | 6/2016 |
| IN | 201105914 | 11/2012 |
| IN | 201107355 | 11/2012 |
| IN | 2011005417 | 11/2012 |
| IN | 201107802 | 12/2012 |
| IN | 201202094 | 4/2013 |
| JP | 52-123408 A | 10/1977 |
| JP | 56-089844 A | 7/1981 |
| JP | 04-324799 A | 11/1992 |
| JP | 08-072038 A | 3/1996 |
| JP | 09-085030 A | 3/1997 |
| JP | 11-009925 A | 1/1999 |
| JP | 3274027 B2 | 4/2002 |
| JP | 2003-040691 A | 2/2003 |
| JP | 2006-096634 A | 4/2006 |
| JP | 2009-006262 A | 1/2009 |
| JP | 2009-190968 A | 8/2009 |
| JP | 2009-227580 A | 10/2009 |
| JP | 2009-542569 A | 12/2009 |
| JP | 2010-001184 A | 1/2010 |
| JP | 2010-013293 A | 1/2010 |
| JP | 2010-077008 A | 4/2010 |
| JP | 2010-510959 A | 4/2010 |
| JP | 2010-111551 A | 5/2010 |
| JP | 2010-111552 A | 5/2010 |
| JP | 2010-150054 A | 7/2010 |
| JP | 2010-159172 A | 7/2010 |
| JP | 2010-189204 A | 9/2010 |
| JP | 2010-228935 A | 10/2010 |
| JP | 2011-005408 A | 1/2011 |
| JP | 2011-005417 A | 1/2011 |
| JP | 2011-504869 A | 2/2011 |
| JP | 2011-506237 A | 3/2011 |
| JP | 4824769 B2 | 11/2011 |
| JP | 2012-188346 A | 10/2012 |
| JP | 2013-512189 A | 4/2013 |
| JP | 2015-193497 A | 11/2015 |
| KR | 10-0931755 B1 | 12/2009 |
| PT | 107613 A | 10/2015 |
| WO | 98/43927 A2 | 10/1998 |
| WO | 01/79139 A1 | 10/2001 |
| WO | 2008/005291 A1 | 1/2008 |
| WO | 2008/027219 A2 | 3/2008 |
| WO | 2009/070218 A2 | 6/2009 |
| WO | 2009/070242 A1 | 6/2009 |
| WO | 2009/108299 A1 | 9/2009 |
| WO | 2009/108312 A2 | 9/2009 |
| WO | 2009/119748 A1 | 10/2009 |
| WO | 2009/122538 A1 | 10/2009 |
| WO | 2010/024383 A1 | 3/2010 |
| WO | 2010/098347 A1 | 9/2010 |
| WO | 2010/099369 A1 | 9/2010 |
| WO | 2011/150145 A2 | 12/2011 |
| WO | 2012/166222 A1 | 12/2012 |
| WO | 2014/189740 A1 | 11/2014 |
| WO | 2014/189741 A2 | 11/2014 |
| WO | 2014/189817 A1 | 11/2014 |
| WO | 2015/042499 A2 | 3/2015 |
| WO | 2015/193497 A1 | 12/2015 |
| WO | 2016/138192 A1 | 9/2016 |
| WO | 2017/210251 A1 | 12/2017 |
| WO | 2019/089735 A1 | 5/2019 |

OTHER PUBLICATIONS

Donovan, John W. "Phase transitions of the starch-water system." Biopolymers: Original Research on Biomolecules 18.2 (1979): 263-275. (Year: 1979).*

Mücksch, Christian, and Herbert M. Urbassek. "Molecular dynamics simulation of free and forced BSA adsorption on a hydrophobic graphite surface." Langmuir 27.21 (2011): 12938-12943. (Year: 2011).*

Benbow et al., "Paste flow and extrusion", Oxford series on advanced manufacturing, Oxford, 1993, pp. 153.

Benbow et al., "The extrusion mechanics of pastes—the influence of paste formulation on extrusion parameters", Chemical Eng. Science, vol. 53, 2151, 1987.

Guo Haizhu, "Practical Refractory Materials Handbook"; Beijing; China Building Materials Industry Press, Aug. 2000, p. 421.

H.J. Alves et al., "Spray-dried Powder Granulometry: Influence on the Porous Microstructure of Polished Porcelain Tile", Bol. Soc. Esp. Ceram. V. 49, 4, 239-246 (2010).

Hu Baoyu et al; "Practical Technical Manual for Special Refractory Material"; Beijing Metallurgical Industry Press, Jun. 2004; pp. 315-317.

International Search Report and Written Opinion of the International Searching Authority; PCT/US2018/058414; dated Feb. 11, 2019; 11 Pages; European Patent Office.

Lyckfeldt et al., "Processing of porous ceramics by starch consolidation", Journal of the European Ceramic Society, vol. 18, Issue 2, 1998, pp. 131-140.

Qian Zhirong et al; "Practical Handbook of Refractory Materials"; Beijing: Metallurgical Industry Press, Sep. 1992, p. 169.

Sakamoto et al; "Development and Evaluation of Superporous Ceramics Bone Tissue Scaffold Materials With Triple Pore Structure A) Hydroxyapatite, B) Beta-Tricalcium Phosphate"; Bone Regeneration Chapter 13; www.intechopen.com; pp. 301-320.

Sakar, N., "Thermal gelation properties of methyl- and hydroxypropyl methylcellulose", J. Appl. Polymer Science, vol. 24, 1979, pp. 1073-1087.

Wall-Flow Monoliths, Dieselnet Technology Guide Jul. 1, 2004 (Jul. 1, 2004), pp. 1/16.

Yong Yang et al., "In situ porous alumina/alunimum titanate ceramic prepared by spark plasma sintering from nanostructured powders", Scripta Materialia, 60 (2009), pp. 578-581.

* cited by examiner

BATCH COMPOSITIONS COMPRISING SPHEROIDAL PRE-REACTED INORGANIC PARTICLES AND SPHEROIDAL PORE-FORMERS AND METHODS OF MANUFACTURE OF HONEYCOMB BODIES THEREFROM

CROSS-REFERENCE TO RELATED APPLICATIONS

This application is a National Stage application under 35 U.S.C. § 371 of International Application No. PCT/US2018/058414 filed on Oct. 31, 2018 which claims the benefit of priority under 35 U.S.C. § 119 of U.S. Provisional Application Ser. No. 62/579,579 filed on Oct. 31, 2017 and U.S. Provisional Application Ser. No. 62/579,585, filed Oct. 31, 2017, the contents of which are relied upon and incorporated herein by reference in their entireties

FIELD

The present disclosure relates to batch composition mixtures comprising pre-reacted inorganic particles and methods of manufacturing honeycomb bodies therefrom.

BACKGROUND

Cordierite, silicon carbide, and aluminum titanate-containing ceramic honeycomb bodies have been used in catalytic converters and particulate filters for diesel and gasoline engine exhaust after-treatment.

Such ceramic honeycomb bodies may be manufactured by extruding a plasticized batch composition of inorganic and organic materials and a liquid vehicle (LV), such as deionized water, through an extrusion die of an extruder.

In some batch compositions, pre-reacted spheroidal particles were used in the batch. However, such batch compositions may suffer from certain performance problems.

SUMMARY

Illustrative embodiments of the present disclosure are directed to a batch composition. The batch composition comprises pre-reacted inorganic spheroidal particles having a pre-reacted particle size distribution wherein:

$10 \ \mu m \leq DI_{50} \leq 50 \ \mu m$, and $DIb \leq 2.0$; and pore-former spheroidal particles having a pore-former particle size distribution wherein:

$0.40 \ DI_{50} \leq DP_{50} \leq 0.90 \ DI_{50}$, and $DPb \leq 1.32$, and wherein $DI_{50}$ is a median particle diameter of the pre-reacted particle size distribution of the pre-reacted inorganic spheroidal particles, $DP_{50}$ is a median particle diameter of the pore-former particle size distribution of the pore-former spheroidal particles, $DIb$ is a breadth factor of the pre-reacted particle size distribution of the pre-reacted inorganic spheroidal particles, and $DPb$ is a breadth factor of the pore-former particle size distribution of the pore-former spheroidal particles.

In some embodiments, the batch composition comprises less than 20% of fine inorganic particles based on a total weight of the pre-reacted inorganic spheroidal particles, wherein the fine inorganic particles have a median diameter of less than 5 µm.

In some embodiments, the batch composition comprises less than 10% of fine inorganic particles based on a total weight of the pre-reacted inorganic spheroidal particles, wherein the fine inorganic particles have a median diameter of less than 5 µm.

In some embodiments, the batch composition comprises less than 5% of fine inorganic particles based on a total weight of the pre-reacted inorganic spheroidal particles, wherein the fine inorganic particles have a median diameter of less than 5 µm.

In some embodiments, the pre-reacted inorganic spheroidal particles have an $ARavg \leq 1.2$, wherein $ARavg$ is an average aspect ratio defined as a largest width dimension divided by a smallest width dimension of the pre-reacted inorganic spheroidal particles, on average.

In some embodiments, the pore-former spheroidal particles have an $ARavg \leq 1.1$, In some embodiments, $ARavg$ is an average aspect ratio defined as a largest width dimension divided by a smallest width dimension of the pore-former spheroidal particles, on average.

In some embodiments, the batch composition comprises $20 \ \mu m \leq DI_{50} \leq 50 \ \mu m$.

In some embodiments, the batch composition comprises $20 \ \mu m \leq DI_{50} \leq 40 \ \mu m$.

In some embodiments, the batch composition comprises $DI_{90} \leq 85 \ \mu m$.

In some embodiments, the batch composition comprises $DI_{90} \leq 65 \ \mu m$.

In some embodiments, the batch composition comprises $45 \ \mu m \leq DI_{90} \leq 85 \ \mu m$.

In some embodiments, the batch composition comprises $DI_{10} \geq 8 \ \mu m$.

In some embodiments, the batch composition comprises $8 \ \mu m \leq DI_{10} \leq 35 \ \mu m$.

In some embodiments, the batch composition comprises $(DI_{90} - DI_{10}) \leq 55 \ \mu m$.

In some embodiments, the batch composition comprises $15 \ \mu m \leq (DI_{90} - DI_{10}) \leq 55 \ \mu m$.

In some embodiments, the batch composition comprises $15 \ \mu m \leq DP_{50} \leq 30 \ \mu m$.

In some embodiments, the batch composition comprises $0.4 \ DI_{50} \leq DP_{50} \leq 0.8 \ DI_{50}$.

In some embodiments, the batch composition comprises $0.4 \ DI_{50} \leq DP_{50} \leq 0.7 \ DI_{50}$.

In some embodiments, the pore-former spheroidal particles are non-hydrophilic.

In some embodiments, the pore-former spheroidal particles comprise a non-hydrophilic polymer.

In some embodiments, the non-hydrophilic polymer comprises polypropylene, polyethylene, polystyrene, polycarbonate, PMMA (polymethylmethacrylate), polyurethanes, and their derivatives and combinations.

In some embodiments, the pore-former spheroidal particles comprise a phase change material.

In some embodiments, the pore-former spheroidal particles comprise a polymer having $MP \geq 100° C.$, wherein $MP$ is a melting point of the pore-former spheroidal particles.

In some embodiments, the pore-former particle size distribution of the pore-former spheroidal particles comprises $DPb \leq 1.30$.

In some embodiments, the pore-former particle size distribution of the pore-former spheroidal particles comprises $DPb \leq 1.25$.

In some embodiments, the pore-former particle size distribution of the pore-former spheroidal particles comprises $(DP_{90}-DP_{10}) \leq 20$ μm.

In some embodiments, the pore-former particle size distribution of the pore-former spheroidal particles comprises $(DP_{90}-DP_{10}) \leq 15$ μm.

In some embodiments, the pore-former spheroidal particles comprise between 5 wt % and 35 wt % by super-addition to a total weight of inorganics in the batch composition.

In some embodiments, the pre-reacted inorganic spheroidal particles comprise spray-dried spheroidal particles.

In some embodiments, the batch composition comprises a weight of 28 wt % ≤ LV ≤ 50 wt % by super-addition to inorganics of the batch mixture, wherein LV is liquid vehicle.

In some embodiments, the batch composition comprises a weight of 22 wt % ≤ LV ≤ 35 wt % by super-addition to inorganics of the batch composition, wherein LV is liquid vehicle, and the pore-former spheroidal particles are non-hydrophillic.

In some embodiments, the batch composition comprises an organic binder that is a combination of a hydroxyethylmethylcellulose binder and a hydroxypropylmethylcellulose binder.

In some embodiments, the pre-reacted inorganic particles comprise one or more crystalline phases.

In some embodiments, the pre-reacted inorganic particles comprise one or more glass phases.

In some embodiments, the one or more crystalline phases comprise at least one of (i) aluminum titanate, (ii) feldspar, (iii) mullite, (iv) titania, (v) magnesia, (vi) alumina, (vii) magnesium dititanate, (viii) silicon carbide, (ix) pseudobrookite, (x) cordierite, (xi) cordierite, magnesia, aluminum titatnate composite, and (xii) combinations thereof.

In some embodiments, the pre-reacted inorganic spheroidal particles comprise a first crystalline phase predominantly of a solid solution of aluminum titanate and magnesium dititanate, and a second crystalline phase comprising cordierite.

In some embodiments, the pre-reacted inorganic spheroidal particles comprise a pseudobrookite crystalline phase comprising predominately alumina, magnesia, and titania, a second crystalline phase comprising cordierite, and a third crystalline phase comprising mullite.

In some embodiments, the batch composition comprises Tau Y/Beta of greater than 4.0.

In some embodiments, the batch composition comprises Tau Y/Beta of greater than 4.5.

Illustrative embodiments of the present disclosure are also directed to a method of manufacturing a honeycomb body. The method comprises mixing a batch composition comprising pre-reacted inorganic spheroidal particles, fine inorganic particles, organic binder, pore-former spheroidal particles, and a liquid vehicle to form a paste, wherein the pre-reacted inorganic spheroidal particles have a pre-reacted particle size distribution of:

10 μm ≤ $DI_{50}$ ≤ 50 μm, and $DIb \leq 2.0$; and wherein the pore-former spheroidal particles having a pore-former particle size distribution of:

0.40 $DI_{50}$ ≤ $DP_{50}$ ≤ 0.90 $DI_{50}$, and $DPb \leq 1.32$, and wherein $DI_{50}$ is a median particle diameter of the pre-reacted particle size distribution of pre-reacted inorganic spheroidal particles, $DP_{50}$ is a median particle diameter of the pore-former particle size distribution of pore-former spheroidal particles, DIb is the breadth factor of the pre-reacted particle size distribution of pre-reacted inorganic spheroidal particles, and DPb is the breadth factor of the pore-former particle size distribution of pore-former spheroidal particles; and wherein the fine inorganic particles comprise less than 20 wt % having a median particle diameter of less than 5 μm based on a total weight of the pre-reacted inorganic spheroidal particles. The method further comprises forming the paste into a wet green honeycomb body.

In some embodiments, the method comprises a Tau Y/Beta of greater than 4.0.

In some embodiments, the method comprises a Tau Y/Beta of greater than 4.5.

In some embodiments, the method further comprises drying the wet green honeycomb body to form a dried green honeycomb body; and firing the dried green honeycomb body to form a porous ceramic honeycomb body.

Additional features of the disclosure will be set forth in the description which follows, and in part will be apparent from the description, or may be learned by practice of the disclosure. It is to be understood that both the foregoing general description and the following detailed description are exemplary and explanatory and are intended to provide further explanation of the disclosure.

BRIEF DESCRIPTION OF THE DRAWINGS

The accompanying drawings, which are included to provide a further understanding of the disclosure, and are incorporated in and constitute a part of this specification, illustrate example embodiments of the disclosure and together with the description serve to explain the principles of the disclosure.

DETAILED DESCRIPTION

Figure 1:
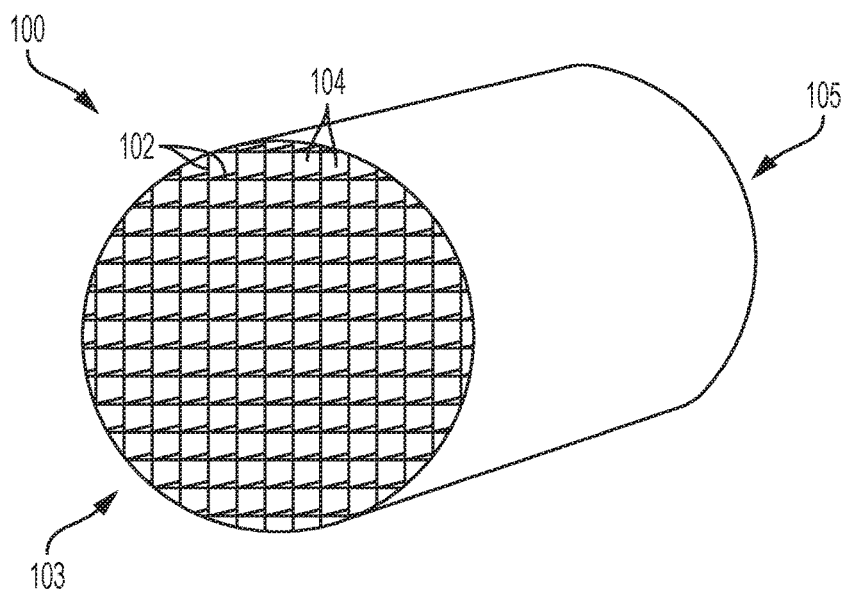
FIG. 1 illustrates a schematic of a honeycomb body according to exemplary embodiments of the disclosure.

The disclosure is described more fully hereinafter with reference to the accompanying drawings, in which exemplary embodiments of the disclosure are shown. This disclosure may, however, be embodied in many different forms and should not be construed as being limited to the embodiments set forth and described herein. Rather, the embodiments disclosed herein are provided so that this disclosure is thorough and fully conveys the scope of the disclosure. In the drawings, the overall size and the relative sizes are not drawn to scale. Like reference numerals in the drawings are used throughout the disclosure to denote like elements.

In the manufacture of ceramic honeycomb articles, a plasticized batch composition comprising inorganic and organic materials and a liquid vehicle (LV) such as water is extruded through an extrusion die of an extruder. It is a goal to extrude the plasticized batch at a feed rate that is as fast as practical, while providing good-quality green bodies, as the feed rate is at least somewhat coupled to the final manufacturing cost of the ceramic honeycomb. In particular, in honeycomb manufacture, the plasticized batch composition is extruded through the extrusion die having a plurality of thin intersecting die slots formed therein. Upon exiting the extrusion die, the extruded green honeycomb body should exhibit good overall dimensional control, limited amount of sag or deformation under its own weight, good knit between various cell walls, good cell shape (e.g., square or other desired shape), good wall formation (e.g., minimal waviness), and no wall tearing. Minimal shrinkage of the honeycomb body upon being dried is also a desired goal.

Conventional batch compositions for making ceramic honeycomb bodies involve mixing and/or mulling inorganic powders wherein the resulting combined inorganic particle distribution has a rather broad particle size distribution. The inorganic powders may comprise sources of titania, sources of alumina, sources of silica, sources of magnesia, and the like. Such inorganic particles are mixed along with an organic binder (e.g., a cellulose-based binder), possibly a lubricant, and a LV (e.g., deionized water) and, in some cases, a pore-former material to form a plasticized batch composition. This plasticized batch composition is then extruded through an extrusion die of an extruder to form a green body (e.g., a green honeycomb body). The green honeycomb body is subsequently dried and fired by conventional processes to produce a porous ceramic honeycomb body.

In other embodiments, sinter-bonded or reaction-bonded pre-reacted inorganic spheroidal particles have been proposed for use in batch compositions suitable for the manufacture of porous ceramic honeycomb bodies, such as described in WO 2014/189741.

Use of conventional pore-former material combinations of starch and graphite in such batch compositions comprising pre-reacted inorganic spheroidal particles may have certain defects, such as tears, which are thought to be due to water micro-segregation in the batch composition. "Pre-reacted inorganic spheroidal particles" are defined herein as inorganic particles that are formed (e.g., by spray-drying) formed as spheroids and that are at least partially reacted (e.g., by calcining or by firing) to comprise a desired ceramic crystalline phase composition prior to being provided to the batch composition.

However, as discovered by the inventors hereof, when combinations of inorganic spheroidal particles with certain spheroidal pore-former particles are used, green body honeycombs produced by extrusion are very smooth in surface texture and were substantially free from wall defects, such as tears. Moreover, very low levels of pore-former materials may be needed to provide high-porosity ceramic honeycomb bodies. In some embodiments, less LV may be used in the batch composition. Such batch compositions surprisingly provide excellent extrudability as well as relatively high extrusion feed rates.

Notably, during extrusion of honeycomb green bodies it is desirable to utilize a relatively stiff batch (having a high Tau Y—to be described fully later herein) because this may lead to better shape control of the wet green honeycomb body, i.e., less wall and/or cell distortion, less tearing, and less slumping (geometrical sagging as a result of distortion under the honeycomb body's own weight). The stiffness coefficient "Tau Y" is a measure of stiffness of the particular plasticized batch composition. Tau Y is measured and determined as described below herein. Conventional batches with stiffer batch characteristics may result in higher extrusion pressures and slower feed rates. Addition of LV (e.g., deionized water) to a conventional batch composition may allow for improved feed rate due to lower friction between the batch and the surfaces of thin die slots of an extrusion die, but this may be at the expense of shape control of the wet and dried green honeycomb body, i.e., sagging distortion, failure of the walls to knit together, and other defects. The friction coefficient "Beta" is a measure of friction and also impacts the wall drag, which is the friction of the plasticized batch composition against the die wall surfaces as the batch composition passes through a defined size slot. Beta is measured and determined as is described below herein.

Thus, in conventional batch compositions, there is a natural trade-off between desirable high batch stiffness (high Tau Y) and low wall friction (low Beta). Therefore, the ratio between the batch stiffness coefficient (Tau Y) divided by the friction coefficient (Beta) may be used to characterize rheological behavior of the batch composition during an extrusion (i.e., Tau Y/Beta). High Tau Y/Beta ratio is desirable (at sufficiently high stip of the batch composition so that the extruded honeycomb bodies substantially preserve their shape and do not sag under their own weight) and, if achievable, may enable higher extrusion rates. However, Tau Y/Beta ratios for conventional aluminum titanate batches are very low, i.e., in the range of about 1.0 to less than about 1.5. Increases on the ratio of Tau Y/Beta have been elusive, especially for aluminum-titanate-based compositions.

So, improvements in batch compositions that can lead to higher feed rates, while also retaining good shape control and good quality of the wet and dried green honeycomb body would be considered a major advancement in the honeycomb body extrusion art.

In particular, the inventors hereof have discovered that certain combinations of pre-reacted inorganic spheroidal particles with organic pore-former spheroidal particles provide improved batch rheology and die extrusion behavior. In particular, improved ratios of Tau Y/Beta may be achieved in accordance with one or more embodiments of the disclosure. In embodiments, when the pre-reacted inorganic spheroidal particles and the pore-former spheroidal particles comprise a relatively-narrow particle size distribution coupled with median particles sizes (D50) being provided in a defined relationship, the batch composition exhibits excellent extrusion properties and exhibit high ratios of Tau Y/Beta, while also providing excellent shape control of the extruded green body honeycomb. For example, ratios of Tau Y/Beta≥4.0, or even Tau Y/Beta≥4.5 may be achieved in some embodiments. Moreover, properties of the resultant green honeycomb body may comprise a low level of wall and cell distortion, low tearing, smooth wall finish, good final dimensional control, low levels of slump, and low levels of shrinkage.

One or more embodiments of the present disclosure relate to a batch composition that comprises a pre-reacted inorganic spheroidal particles combined with pore-former spheroidal particles. The batch composition may further comprise a small amount (i.e., less than a defined amount) of fine inorganic binder particles (hereinafter "fines"). The distribution of the pre-reacted inorganic spheroidal particles is selected to comprise specific controlled median particle size ($DI_{50}$) as well as a relatively-narrow particle size distribution thereof. The narrowness of the distribution may be defined by DIb, wherein DIb is a distribution breadth factor of the pre-reacted inorganic spheroidal particles. Other characterizations of the narrowness may be used, such as $DI_{90}$-$DI_{10}$, which is further defined herein.

Likewise, the distribution of the pore-former spheroidal particles is selected to comprise specific controlled median particle size ($DP_{50}$) and narrow pore-former particle size distribution. One measure of the narrowness of the particle is distribution is DPb, wherein DPb is a pore-former distribution breadth factor. Other characterizations of the narrowness of the distribution may be used.

In embodiments, median particle size ($DI_{50}$) of the pre-reacted inorganic spheroidal particles is selected to be with a specified range of sizes. More specifically, the median diameter $DP_{50}$ of the pore-former spheroidal particles is selected to be within a specific range of sizes as compared to the controlled median particle size ($DI_{50}$) of the pre-reacted inorganic spheroidal particles. In particular, the sizes are selected to have a specific size relationship as expressed below, wherein each of the pre-reacted inorganic spheroidal particles and the pore-former spheroidal particles also comprises a relatively-narrow particle size distribution.

Example embodiments of the present disclosure provide a batch composition that is useful in the formation of green body articles, such as a honeycomb body 100 shown in FIG. 1. The honeycomb body 100 comprises a plurality of intersecting walls 102 that extend from one end 103 of the honeycomb body 100 to the other end 105. The intersecting walls 102 form a plurality of channels 104 that also extend from end-to-end in a parallel relationship. Square cell shapes are shown. However, other cell shapes in transverse cross-section may be formed such as rectangular, triangular, hexagonal, round, or combinations thereof. The honeycomb body 100 (e.g., green honeycomb body) may be dried and fired to form a porous ceramic honeycomb body comprising porous walls. The intersecting walls 102 of the porous ceramic honeycomb body produced after firing comprise open and interconnected porosity. Any suitable overall cross-sectional size, length, shape (e.g., round, tri-lobed, oval, race track, and the like) of the honeycomb body 100 may be formed from the batch composition.

Additional features and characteristics of example embodiments of the batch composition, green body articles such as green honeycomb bodies manufactured from the batch composition, and ceramic articles such as porous ceramic honeycomb bodies produced from the batch composition are disclosed herein with reference to FIGS. 1-10 herein.

In more detail, embodiments of the disclosure provide a batch composition comprising specific combinations of pre-reacted inorganic spheroidal particles and pore-former spheroidal particles. The combination may provide superior extrusion rates and batch processibility.

Inorganic Spheroidal Particles

In embodiments, the batch composition comprises pre-reacted inorganic spheroidal particles having a pre-reacted particle size distribution, which is expressed by Eqn. 1 below:

$$10 \ \mu m \leq DI_{50} \leq 50 \ \mu m \qquad \text{Eqn. 1}$$

and may also comprise a relatively-narrow particle size distribution expressed by Eqn. 2 below:

$$DIb \leq 2.0 \qquad \text{Eqn. 2}$$

wherein $DI_{50}$ is a median particle diameter of the particle size distribution of pre-reacted inorganic spheroidal particles, and DIb is a distribution breadth factor of the particle size distribution of pre-reacted inorganic spheroidal particles, which is one measure that reflects a relative narrowness of the particle size distribution. The breadth factor DIb of the particle size distribution of pre-reacted inorganic spheroidal particles may be defined by Eqn. 3 shown below:

$$DIb = \{DI_{90} - DI_{10}\}/DI_{50} \qquad \text{Eqn. 3}$$

$DI_{90}$ is defined herein as a certain coarse particle diameter of a pre-reacted inorganic spheroidal particle within the particle size distribution of pre-reacted inorganic spheroidal particles, wherein 90% of the pre-reacted inorganic spheroidal particles in the particle size distribution have a diameter that is equal to or less than the certain coarse particle diameter, i.e., the remaining particles (approx. 9.9999%) have a larger particle diameter. $DI_{10}$ is defined herein as a certain fine particle diameter of a particle within the particle size distribution of the pre-reacted inorganic spheroidal particles, wherein 10% of the pre-reacted inorganic spheroidal particles in the particle size distribution have a particle diameter that is equal to or less than the fine particle diameter, i.e., the remaining (approx. 89.9999%) have a larger particle diameter.

Although DIb is one measure of the relative narrowness of the particle size distribution of the pre-reacted inorganic spheroidal particles, other measures may be used to characterize the relative narrowness of the particle size distribution of the pre-reacted inorganic particles, such as $DI_{90}$-$DI_{10}$.

$DI_{50}$

In some embodiments of the batch composition, the pre-reacted inorganic spheroidal particles have a particle size distribution wherein $10 \ \mu m \leq DI_{50} \leq 50 \ \mu m$ (comprising 10 μm, 15 μm, 20 μm, 25 μm, 30 μm, 35 μm, 40 μm, 45 μm, and 50 μm) and also comprising all sub-ranges and sub-values between and comprising 10 μm and 50 μm, wherein $DI_{50}$ is the median particle diameter of the particle size distribution of the pre-reacted inorganic spheroidal particles.

In some embodiments, the pre-reacted inorganic spheroidal particles have a particle size distribution wherein the range of $DI_{50}$ is even narrower. For example, in further embodiments, the median particle diameter $DI_{50}$ of the pre-reacted inorganic spheroidal particles may be 20 µm≤$DI_{50}$≤50 µm, or even 20 µm≤$DI_{50}$≤40 µm. The pre-reacted inorganic spheroidal particles may be formed by a spray-drying process. In some embodiments, the median particle diameter $DI_{50}$ of the pre-reacted inorganic spheroidal particles may be adjusted during their formation by changing the nozzle type, nozzle tip inside diameter, nozzle rotation rate, nozzle pressure, size and type of the fine inorganic particulates, temperature settings, organic binder, dispersant, and surfactant types and levels, and solids loading (i.e., solids to liquid ratio) in a spray-drying process when producing the green inorganic spheroidal particles. Spray-drying of the green spheroidal particles is disclosed in U.S. Pat. Pub. No. 2016/0251249, for example.

In other embodiments, the narrowness of the relatively coarse, pre-reacted inorganic spheroidal particles may be enhanced by certain particle processing adapted to remove some fraction or fractions of pre-reacted inorganic spheroidal particles therein. For example, processing such as sieving, air classification, separation by settling or sedimentation, or the like may be used to remove the coarse fraction, fine fraction, or both from the particle size distribution. For example, a coarse fraction in the particle size distribution with sizes larger than about 60 micrometer can be removed by passing the powder through a—270 mesh sieve (with 53 micrometer mesh holes) and thus removing particles smaller than about 53 micrometers. Other sieve sizes can be used to remove other fractions from the large end of the particle size distribution. Likewise, small fractions may be removed by using smaller mesh sieve and retaining the larger particles. Other separation techniques can also be used.

The green inorganic spheroidal particles may be formed by spray-drying a slurry containing the inorganics, which then may be calcined or fired to produce the pre-reacted inorganic spheroidal particles. Rotary calcining at a temperature between about 1000° C. and 1650° C., or even between about 1200° C. to 1600° C., may be used. The specific calcining temperature will depend upon the specific composition of the inorganic particles that are contained in the slurry and the desired phase composition of the pre-reacted inorganic spheroidal particles. Thus, it should be recognized, the pre-reacted inorganic spheroidal particles may have a particle size distribution that may be engineered and/or pre-processed to meet the above particle size distribution parameters as expressed in Eqns. 1 and 2 above or other even more narrow characteristics.

$DI_{90}$ and $DI_{10}$

In some example embodiments, the distribution of pre-reacted inorganic spheroidal particles in the batch composition may have a $DI_{90}$≤85 µm, or even a $DI_{90}$≤75 µm, or even a $DI_{90}$≤65 µm, or even a $DI_{90}$≤55 µm in some embodiments. In some embodiments, the pre-reacted inorganic spheroidal particles in the batch composition may have the range of 45 µm≤$DI_{90}$≤85 µm, or even 45 µm≤$DI_{90}$≤65 µm. Such ranges may provide useful ranges of porosity, and may produce particularly narrow pore size distributions in a fired honeycomb that can be useful in highly-catalyzed filters for producing relatively low pressure drop, relatively high filtration efficiency, and relatively high catalyst activity.

In some example embodiments, the distribution of pre-reacted inorganic spheroidal particles of the batch composition may have a $DI_{10}$≥8 µm, and in some embodiments a $DI_{10}$≥10 µm. In other embodiments, the distribution of pre-reacted inorganic spheroidal particles of the batch composition may have a $DI_{10}$≥20 µm, or even a $DI_{10}$≥30 µm. In some batch compositions, the pre-reacted inorganic spheroidal particles may have $DI_{10}$ that ranges as follows: 8 µm≤$DI_{10}$≤35 µm, or even 10 µm≤$DI_{10}$≤35 µm.

The narrowness of distributions of the pre-reacted inorganic spheroidal particles in some batch compositions may comprise combinations of $DI_{10}$≥3 µm and $DI_{90}$≤85 µm, for example. In other batch compositions, the pre-reacted inorganic spheroidal particles have combinations of $DI_{10}$≥3 µm and $DI_{90}$≤40 µm. In certain exemplary embodiments, combinations of $DI_{10}$≥8 µm and $DI_{90}$≤40 µm may be provided.

The narrowness of the pre-reacted inorganic spheroidal particles may alternatively be expressed by the function $DI_{90}$-$DI_{10}$. In some embodiments, the distribution of the pre-reacted inorganic spheroidal particles may have a $DI_{90}$-$DI_{10}$≤55 µm, or even a $DI_{90}$-$DI_{10}$≤40 µm, or even a $DI_{90}$-$DI_{10}$≤30 µm, or even a $DI_{90}$-$DI_{10}$≤20 µm. In some particularly narrow embodiments of the distribution of the pre-reacted inorganic spheroidal particles, $DI_{90}$-$DI_{10}$≤15 µm.

The range of $DI_{90}$-$DI_{10}$ may be 15 µm≤$DI_{90}$-$DI_{10}$≤55 µm in some embodiments, or may be 25 µm≤$DI_{90}$-$DI_{10}$≤55 µm in other embodiments. In some particularly narrow embodiments, the range of $DI_{90}$-$DI_{10}$ of the distributions of the pre-reacted inorganic spheroidal particles may be 30 µm≤$DI_{90}$-$DI_{10}$≤55 µm.

As stated above, in some embodiments, the formed green inorganic spheroidal particles or the calcined or fired pre-reacted inorganic spheroidal particles may be sieved or otherwise fractionated to remove fine tail portions and/or coarse tail portions so that the above distribution breadth factor DIb, $DI_{10}$, $DI_{90}$, and/or $DI_{90}$-$DI_{10}$ of the particle size distribution of pre-reacted inorganic spheroidal particles may be met. Particle size as specified herein is measured by a Microtrac S3500 laser diffractometer.

Figure 4A:
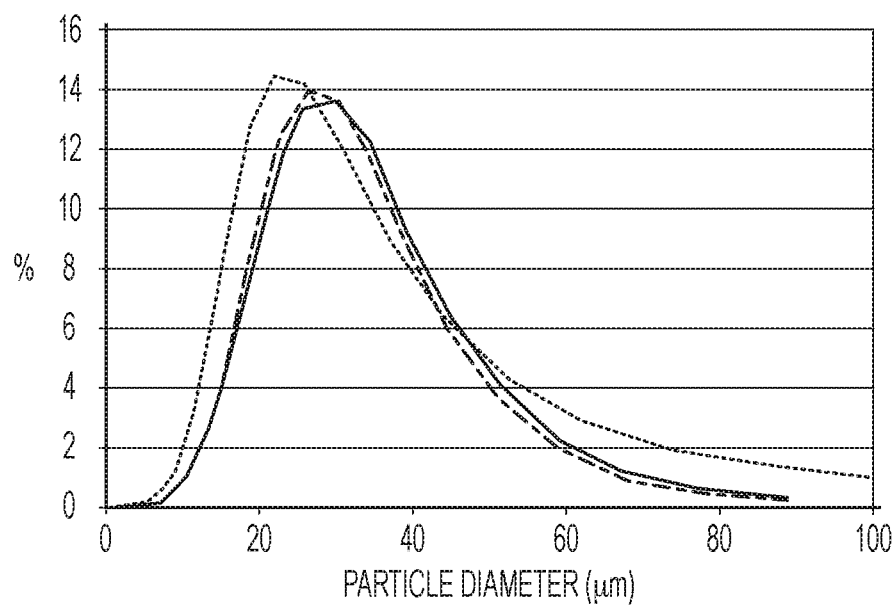
FIGS. 4A and 4B illustrate plots of particle size distributions of various examples of pre-reacted inorganic spheroidal particles according to embodiments.
Figure 4B:
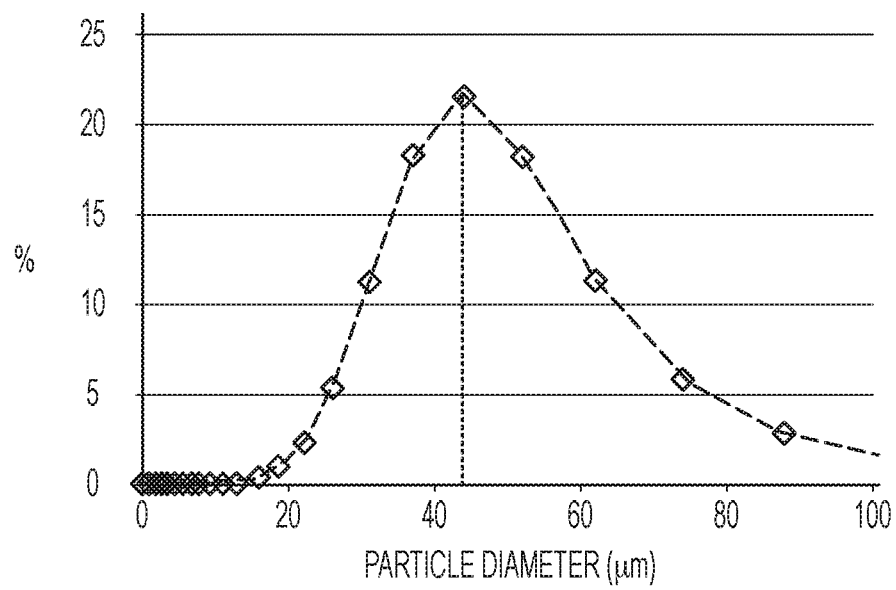

Examples of certain pre-reacted inorganic spheroidal particles are shown in Table 1 below. FIGS. 4A and 4B illustrate plotted examples of some representative particle size distributions of pre-reacted inorganic spheroidal particles that have been formed by a spray-drying process (SPD). A phase composition of the pre-reacted inorganic spheroidal particles may be engineered to be any desired phase composition that is wanted in the final honeycomb body. For example, the phase composition of the pre-reacted inorganic spheroidal particles may comprise phases of cordierite, mullite, and aluminum titanate (hereinafter "CMAT"). However, other compositions are possible as described herein. Other suitable methods for forming the pre-reacted inorganic spheroidal particles may comprise spin drying, and atomizing the slurry to form green inorganic particles, which may then be calcined to form the pre-reacted inorganic spheroidal particles.

TABLE 1

Pre-reacted Particle Size Distribution

| Batch # | SPD/Pre-reacted CMAT | $DI_{50}$ (μm) | $DI_{90}$ (μm) | $DI_{10}$ (μm) | $DI_{95}$ (μm) | $DI_5$ (μm) | DIb |
|---|---|---|---|---|---|---|---|
| 1 | CMAT 1270 C./6 h | 28 | 64 | 10 | 88 | 8 | 1.90 |
| 2 | CMAT 1370 C./4 h | 40 | 59 | 29 | 67 | 19 | 0.75 |
| 3 | CMAT 1275 C./6 h cyclone | 28 | 64 | 10 | 88 | 8 | 1.90 |
| 4 | CMAT 1350 C./6 h (−270 um) | 40 | 59 | 29 | 67 | 19 | 0.75 |

Additional exemplary embodiments of spray-dried green particles of approximately $DI_{50}$=30 μm to approximately $DI_{50}$=50 μm are shown below in Table 2 below.

TABLE 2

Further example embodiments of pre-reacted inorganic spheroidal particles.

| $DI_{10}$ (μm) | $DI_{50}$ (μm) | $DI_{90}$ (μm) | DIb | $DI_{90} - DI_{50}$ (μm) |
|---|---|---|---|---|
| 22.73 | 33.4 | 51.0 | 0.85 | 28.25 |
| 28.3 | 42.6 | 64.6 | 0.85 | 36.30 |
| 34.1 | 49.4 | 74.2 | 0.81 | 40.10 |
| 30.9 | 46.7 | 74.3 | 0.93 | 43.49 |
| 32.9 | 49.2 | 81.6 | 0.99 | 48.69 |
| 22.8 | 32.9 | 49.6 | 0.82 | 26.86 |
| 23.7 | 35.5 | 54.5 | 0.87 | 30.79 |
| 29.1 | 44.9 | 70.2 | 0.92 | 41.10 |
| 27.7 | 40.3 | 60.6 | 0.82 | 32.88 |
| 31.5 | 48.1 | 75.5 | 0.91 | 43.95 |
| 23.2 | 34.1 | 51.7 | 0.84 | 28.55 |
| 23.0 | 33.6 | 50.6 | 0.82 | 27.59 |
| 31.3 | 45.8 | 69.4 | 0.83 | 38.08 |
| 25.0 | 36.8 | 55.8 | 0.84 | 30.77 |
| 24.5 | 35.7 | 53.7 | 0.82 | 29.24 |
| 29.2 | 44.1 | 66.6 | 0.85 | 37.37 |
| 25.2 | 36.3 | 53.9 | 0.79 | 28.69 |
| 25.6 | 38.4 | 59.0 | 0.87 | 33.40 |
| 29.1 | 42.4 | 63.5 | 0.81 | 34.35 |

The fired pre-reacted spheroidal particle size may be slightly shifted from the green spheroidal particle size. As can be seen from the above, very narrow particle size distributions of the spheroidal particles may be achieved, comprising DIb≤1.0, DIb≤0.95, DIb≤0.90, DIb≤0.85, DIb≤0.80, and in some embodiments even 0.75≤DIb≤1.0. Similarly, the narrowness of the distribution of the spheroidal particle size may be expressed by $D_{90}$-$D_{10}$ wherein 25 μm≤($D_{90}$-$D_{10}$)≤45 μm, for example.

Pore-Former Spheroidal Particles

The batch composition further comprises a distribution of pore-former spheroidal particles having a median particle size $DP_{50}$ of the pore-former particle size distribution selected to be within a selected range with respect to the median particle diameter $DI_{50}$ of the distribution of pre-reacted inorganic spheroidal particles. The selected range of median particle size $DP_{50}$ of the pore-former spheroidal particles is expressed by the relationship shown in Eqn. 4 shown below.

$$0.4\ DI_{50} \leq DP_{50} \leq 0.9\ DI_{50} \qquad \text{Eqn. 4}$$

This range of sizes of pore-former spheroidal particles as compared to the size of the pre-reacted inorganic spheroidal particles may ensure good particle packing with the pre-reacted inorganic spheroidal particles. If the pore-former spheroidal particles are too small in size, then the pore-former spheroidal particles will simply fill the holes of the packing of the pre-reacted inorganic spheroidal particles and not act as pore-former. If the pore-former particle size is larger than $DI_{50}$, then particle packing may be disturbed and there is a risk of relaxing during firing, causing either irregular and/or possibly large shrinkage or, in the worst case, possibly cracking or powderizing the honeycomb during firing. Thus, by using a spheroidal polymer pore-former having a size of less than $DI_{50}$, dense packing of the pre-reacted inorganic spheroidal particles is preserved, which during firing turn into vacancies/pores and without appreciable shrinkage.

In some embodiments, the range of $DP_{50}$ may be 15 μm≤$DP_{50}$≤30 μm. In other embodiments, a narrower range of sizes of pore-former spheroidal particles as compared to the size of the pre-reacted inorganic spheroidal particles in Eqn. 4, may be expressed by the relationships shown in Eqns. 5 and 6 below.

$$0.4\ DI_{50} \leq DP_{50} \leq 0.8\ DI_{50} \qquad \text{Eqn. 5}$$

$$0.4\ DI_{50} \leq DP_{50} \leq 0.7\ DI_{50} \qquad \text{Eqn. 6}$$

Even narrower ranges may be used, such as 0.4 $DI_{50}$≤$DP_{50}$≤0.6 $DI_{50}$, or 0.4 $DI_{50}$≤$DP_{50}$≤0.5 $DI_{50}$. The above may result in advantages of narrow pore size distribution in the final fired honeycomb body and may provide for low pressure drop for particulate filters in case of narrow pore size distribution (d50-d10/d50) for a particular porosity. Moreover, narrow pore size distribution provides better catalyst use during catalyst coating and higher final catalyst efficiency.

The batch composition may further comprise a relatively-narrow particle size distribution of the pore-former spheroidal particles. In embodiments, the relative narrowness of the particle size distribution of the pore-former spheroidal particles may be expressed, in one aspect, by the relationship shown in Eqn. 7 below:

$$DPb \leq 1.32 \qquad \text{Eqn. 7}$$

wherein DPb is the distribution breadth factor of the particle size distribution of pore-former spheroidal particles. The distribution breadth factor DPb of the distribution of pore-former spheroidal particles is defined by Eqn. 8 shown below:

$$DPb = \{DP_{90}-DP_{10}\}/DP_{50} \qquad \text{Eqn. 8}$$

$DP_{90}$ is defined herein as a certain coarse particle diameter of a pore-former spheroidal particle within the pore-former particle size distribution, wherein 90% of the pore-former spheroidal particles in the pore-former particle size distribution have a diameter that is equal to or less than the certain coarse particle diameter, i.e., the remaining particles (approx. 9.9999%) have a larger diameter. $DP_{10}$ is defined herein as a certain fine particle diameter of a pore-former spheroidal particle within the pore-former particle size distribution, wherein 10% of the pore-former spheroidal particles in the pore-former particle size distribution have a particle diameter that is equal to or less than the fine particle diameter, i.e., the remaining (approx. 89.9999%) have a larger diameter.

In other embodiments, the narrowness of the particle size distribution of pore-former spheroidal particles may be expressed by Eqn. 9 or Eqn. 10 shown below.

$$DPb \leq 1.30 \qquad \text{Eqn. 9}$$

$$DPb \leq 1.25 \qquad \text{Eqn. 10}$$

In other embodiments, the narrowness of the particle size distribution of pore-former spheroidal particles may be may be expressed by $DP_{90}$-$DP_{10}$, wherein ($DP_{90}$-$DP_{10}$)$\leq 20$ μm, or even ($DP_{90}$-$DP_{10}$)$\leq 15$ μm in some embodiments.

The pore-former spheroidal particles may be provided in any suitable amount in the batch composition depending upon the porosity that is to be achieved in the porous ceramic honeycomb body 100. For example, the pore-former spheroidal particles may be provided in the batch composition in an amount between about 5 wt % SAT and 40 wt % SAT, or even between about 10 wt % SAT and 25 wt % SAT in some embodiments, wherein SAT is based on wt % of the total inorganics that are present in the batch composition. "SAT" as used herein means by super-addition based upon a total weight of the inorganic materials contained in the batch composition.

In some embodiments, the pore-former spheroidal particles within the batch composition may comprise one or more non-hydrophilic materials. For example, the pore-former spheroidal particles may comprise a polymer material that is non-hydrophilic. Non-hydrophilic materials are either neutral or hydrophobic.

Examples of non-hydrophilic polymers may comprise polypropylene, polyethylene, polystyrene, polycarbonate, PMMA (polymethylmethacrylate), polyurethanes, and their derivatives and combinations. The non-hydrophilic pore-former spheroidal particles within the batch composition can comprise hollow bubbles or may be porous in some embodiments. The inventors herein have discovered that the use of pore-former spheroidal particles with low hydrophilicity (neutral nature without being hydrophobic) as compared to natural potato, pea, or corn pore-formers translates into a batch composition comprising less batch LV % for comparable batch stiffness (Beta) as compared to batches containing highly hydrophilic pore-formers, such as starches. This translates into a batch composition comprising less batch LV % for comparable batch stiffness (Beta) as compared to batch compositions containing highly hydrophilic pore-formers, such as starches. This has the concomitant advantage of providing less time to dry and less shrinkage of the extruded honeycomb body upon drying and thus improved final shape and dimension control. Less wall tearing during extrusion may also result.

In more detail, exemplary embodiments of the pore-former spheroidal particles may comprise non-hydrophilic polymer particles that may have a melting point MP of MP$\geq$100° C., or even MP$\geq$120° C., for example. In some embodiments, the pore-former spheroidal particles may comprise a phase change material. A "phase change material" is a substance with a high heat of fusion which, melting and solidifying at a certain temperature, is capable of storing and releasing large amounts of energy.

Examples of particles size distributions of non-hydrophilic pore-former spheroidal particles are shown in Table 3 below. However, other suitable pore-former spheroidal particles having the desired median particle size and narrowness may be used, such as hydrophilic polymers.

TABLE 3

Pore-Former Spheroidal Particle Size Examples

| Pore-Former # | Type | $DP_{50}$ (μm) | $DP_{90}$ (μm) | $DP_{10}$ (μm) | DPb |
|---|---|---|---|---|---|
| 1 | Non-Hydrophilic Polymer | 25.8 | 39.8 | 8.6 | 1.21 |
| 2 | Non-Hydrophilic Polymer | 17.1 | 26.4 | 3.9 | 1.32 |

Figure 5:
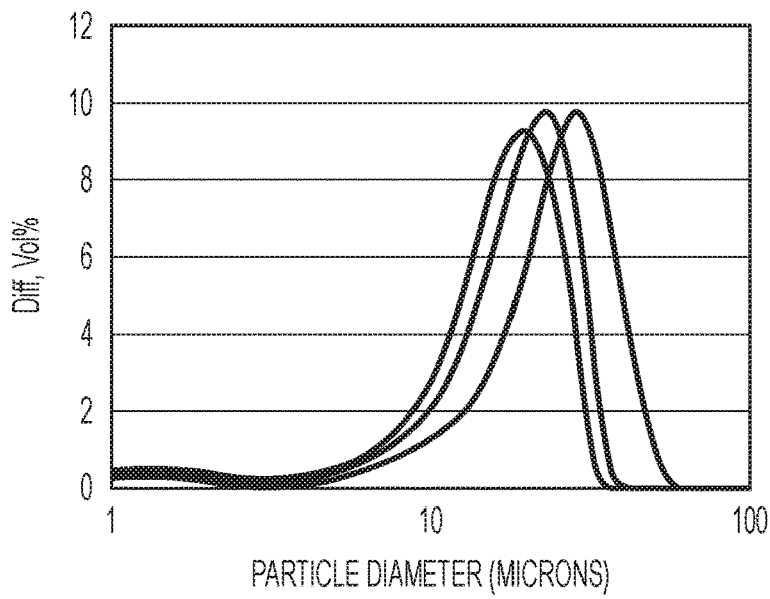
FIG. 5 illustrates a graphical plot of particle size distributions of polymer pore-former spheroidal particles according to exemplary embodiments of the disclosure.

Representative example particle size distributions (Differential Vol. % versus Particle Diameter (microns)) of these types of pore-former polymer spheroidal particles are shown in FIG. 5. As should be recognized, any suitable diameter of pore-former polymer spheroid particles may be produced to meet the size relationship of the pre-reacted inorganic spheroidal particles in accordance with the relationship described in, for example, Eqn. 4 herein.

Fines

Additionally, the batch composition may comprise a small weight percentage of fine inorganic particles ("fines"). In particular, the batch composition may comprise less than 20 wt % SAP of fine inorganic particles. The fine inorganic particles ("fines") are relatively-small particles wherein the particle size distribution of "fines" added to the batch composition and may have a median particle diameter of the distribution of the "fines" of less than 5 μm. "SAP" as used herein means by super-addition based upon a total weight of the pre-reacted inorganic spheroidal particles (PI) contained in the batch composition as defined by Eqn. 11 shown below:

$$\text{Fines in wt \% SAP=(wt. of "fines"/wt. of } PI)\times 100 \qquad \text{Eqn. 11}$$

In other embodiments, the batch composition comprises less than 15 wt % SAP of fine inorganic particles wherein the particle size distribution of "fines" has a median particle diameter of less than 5 μm. In yet other embodiments, the batch composition comprises less than 10 wt % SAP of fine inorganic particles wherein the distribution of "fines" has a median diameter of less than 5 μm, or even less than 7.5 wt % SAP of fine inorganic particles wherein the particle size distribution of "fines" has a median diameter of less than 5 μm. The "fines" in the batch composition function as an inorganic binder in the batch forming ceramic interconnections between the pre-reacted inorganic spheroidal particles upon firing. Such fine oxide powders ("fines") have a large surface area per mass and interact strongly with LV in the batch composition due to their large surface area. Most "fines" are hydrophilic, so they tend to "bond" a lot of LV, thus decreasing the mobility of LV and particles, which functions to thicken the batch composition and increase the friction of the batch composition. More internal batch composition friction means more friction to pass the batch composition through the extrusion die. This translates into more extrusion pressure to push the batch composition through the extrusion die, and thus both low $T_{onset}$, and low extrusion rate. Thus, minimizing the fines in the batch composition is desirable.

In some embodiments, the "fines" in the batch composition can comprise a combination of fine talc, fine alumina, and fine silica (e.g., colloidal silica). In further embodiments, the fine alumina and the fine silica particles added to the batch composition each comprise a particle size distribution that has a median particle diameter of less than 2 μm. However, the "fines" can comprise any suitable combination of inorganic particles having median particle diameter of less than 5 µm that comprise sources of silica, alumina, and/or magnesia.

In some embodiments, the fine inorganic particles ("fines") in the batch composition may comprise a combination of alumina, talc, and silica particles, each having a particle distribution with a median particle diameter of less than 5 µm.

In yet other embodiments, the batch composition comprises less than 15 wt % and greater than 3 wt % of fine inorganic particles, wherein the distribution of the fine inorganic particles has a median particle diameter of less than 5 µm. In other embodiments, the batch composition comprises less than 10 wt % and greater than 3 wt % of fine inorganic particles, wherein the distribution of the fine inorganic particles have a median particle diameter of less than 5 µm. In some embodiments, the batch composition comprises less than 7.5 wt % and greater than 3 wt % of fine inorganic particles, wherein the distribution of the fine inorganic particles has a median particle diameter of less than 5 µm.

In some embodiments, the fines in the batch composition comprise between about 1 wt % SAP and 5 wt % SAP alumina particles, 1 wt % SAP to 7 wt % talc particles, and 0.5 wt % SAP to 3 wt % SAP silica particles, wherein SAP is by super-addition based on a total weight of the pre-reacted inorganic spheroidal particles contained in the batch composition. In some embodiments, the fine inorganic particles may comprise very fine alumina particles with a particle distribution having a median particle diameter of less than about 1 µm, or even less than 0.7 µm in some embodiments. In some embodiments, the fine inorganic particles may comprise fine talc particles with a particle distribution having a median particle size of less than about 5 µm. In some embodiments, the fine inorganic particles may comprise fine silica particles with a particle distribution having a mean diameter of less than about 0.5 µm, or even less than 0.1 µm. The fine silica particles may be colloidal silica and may be provided as a suspension in water (e.g., a 40% suspension in water), for example.

When "fines" comprising alumina, talc, and silica are used in combination as the inorganic binders, the composition is targeted to form cordierite and some glass phase in the areas between the pre-reacted inorganic spheroidal particles upon firing. To promote glass formation in the final porous ceramic honeycomb, low levels of a glass former may be added to the batch composition, such as ceria, yttria, calcia, other alkaline earth, rare earth or alkali. Such glass formers may be provided in the batch composition at levels of 1.0 wt %, 0.5 wt %, 0.3 wt % or less based upon SAP.

When just alumina and talc are used in combination as the fine inorganic binders ("fines") and possibly a glass former, the composition is targeted to form mullite, cordierite, and a glass phase in the areas between the pre-reacted inorganic spheroidal particles upon firing.

When alumina, talc, silica, and titania are used in combination as the inorganic binders, the composition is targeted to form cordierite, pseudobrookite, and some minor glass phase in the areas between the pre-reacted inorganic spheroidal particles upon firing.

As was discovered by the inventors herein, even small amounts of very fine titania powder with d50<1 µm as "fines" in the batch composition can produce a very viscous slip layer and dramatically lower Tau Y/Beta ratio to near that of conventional non-pre-reacted batches. So, as a matter of design for fast extrusion rates, the inorganic binder in the batch composition may be substantially devoid of titania. Substantially devoid of titania means less than 0.3% SAP of titania. However, titania in the "fines" may be used as a process lever to adjust extrusion properties of the batch composition in some embodiments.

ARavg

Figure 2:
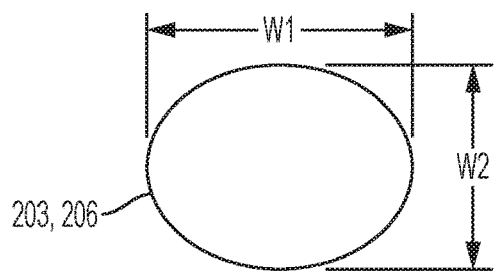
FIG. 2 illustrates a side plan view of a spheroidal particle showing a largest width dimension W1 and a smallest width dimension W2 thereof (shown distorted for illustration purposes).

In embodiments, the pre-reacted inorganic spheroidal particles 203 and the pore-former spheroidal particles 206 are spheroidal. As used herein spheroidal means having a spherical outer shape. The spherical outer shape is defined as shown in FIG. 2 as having an average aspect ratio ARavg, defined as being a largest width dimension W1 divided by shortest width dimension W2 of the spheroidal particles, on average, as is shown in Eqn. 12 below:

$$ARavg = W1/W2 \qquad \text{Eqn. 12}$$

In particular, in one or more embodiments, the pore-former spheroidal particles 206 may have an average aspect ratio ARavg, wherein ARavg≤1.1. Some polymer spheroidal particles having ARavg≤1.1 are commercially available. Similarly, the pre-reacted inorganic spheroidal particles 203 may have an average aspect ratio ARavg wherein ARavg≤1.2.

To achieve this ARavg≤1.2 for the pre-reacted inorganic spheroidal particles 203, the pre-reacted inorganic spheroidal particles 203 may be formed by a spray-drying process, as fully described in WO2016/138192, for example. In some embodiments, the pre-reacted inorganic spheroidal particles 203 may be formed by rotary calcining of spray-dried green particles at a suitable temperature to preserve the spheroidal shape, such as at a temperature between about 1,000° C. and 1,650° C., or even between about 1200° C. and 1,600° C., depending upon the composition of the pre-reacted inorganic spheroidal particles 203.

Organic Binder

The batch composition may comprise an organic binder. The organic binder may be, for example, a hydrophobically-modified cellulose ether binder. In some embodiments, the hydrophobically-modified cellulose ether binder may be, but not limited to, methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxyethylcellulose, hydroxypropylcellulose, sodium carboxy methylcellulose, mixtures thereof, and the like. Methylcellulose and/or methylcellulose derivatives are especially suited as organic binders for use in the batch composition with methylcellulose and hydroxypropyl methylcellulose being used. Sources of cellulose ethers are METHOCEL™ cellulose products available from DOW® Chemical Co.

Some embodiments of the batch composition, such as those disclosed in Table 7 below, may comprise combinations of methylcellulose and hydroxypropyl methylcellulose. Other combinations of cellulose ether binders may comprise cellulose ethers having different molecular weights. Alternatively, the combination of cellulose ethers may comprise cellulose ethers having different hydrophobic groups, different concentrations of the same hydrophobic group, or other cellulose ether combinations. Different hydrophobic groups may be, by way of non-limiting example, hydroxyethyl or hydroxypropyl.

The organic binder may be provided in the batch composition in an amount of about 4.0 wt % SAT to % 8.0 wt % SAT, wherein SAT is based on wt % of the total inorganics (e.g., pre-reacted inorganics spheroidal particles plus inorganic "fines") that are present in the batch composition. The organic binder, in some embodiments, may be a combination of a hydroxyethylmethylcellulose binder and a hydroxypropylmethylcellulose binder, with between about 2.0 wt %

SAT to % 6.0 wt % SAT of the hydroxyethylmethylcellulose binder, and between about 1.0 wt % SAT to 3.0 wt % SAT of the hydroxypropylmethylcellulose binder. Other suitable combinations of organic binders may be used.

LV %

In one or more embodiments, the batch composition comprises a LV, such as de-ionized water, provided in a liquid vehicle percentage LV %. The LV % in the batch composition is substantially above the amounts used in conventional batches, yet remarkably high batch stiffness (high Tau Y—e.g., Tau Y≥8.0) can be retained.

The LV may be added to the batch composition in a weight of 22%≤LV %≤50% by super-addition to the total amount (SAT) of inorganics (e.g., sum of the pre-reacted inorganic spheroidal particles and the "fines") that are present in the batch composition. In exemplary embodiments where the pore-former spheroidal particles comprise a non-hydrophilic material, such as a non-hydrophilic polymer, lower amounts of LV, such as comprising a weight of 22%≤LV≤35% by super-addition (SAT) to inorganics of the batch composition. Thus, naturally less tearing and higher batch stiffness (e.g., higher Beta) may be provided as compared to pore-former spheroidal particles that are hydrophilic. Thus, pore-former spheroidal particles that are non-hydrophilic, or at least less hydrophilic than starches, are advantageous for use in the batch composition.

In use, the LV provides a medium for the organic binder to dissolve in, and thus provides plasticity to the batch composition and wetting of the fine inorganic particles ("fines") and the pre-reacted inorganic spheroidal particles therein. The LV can be an aqueous-based liquid, which are normally water or water-miscible solvents. In one implementation, the LV is deionized water, but other solvents such as alcohols can also be used.

The LV % in the batch composition is LV %≥22% (SAT) in some embodiments, and may be even LV %≥25%, or even LV %≥30%, or even LV %≥35%, or even LV %≥40%, or even LV %≥45% by weight super-addition (SAT) based on the total weight of inorganic particles that are present in the batch composition (the pre-reacted inorganic spheroidal particles plus "fines").

Remarkably, as was discovered by the inventors hereof, wet green honeycomb bodies 100 (FIG. 1) formed from the batch compositions disclosed herein, even comprising such high liquid calls (LV %≥22% (SAT), (LV %≥25% (SAT), or even (LV %≥30% (SAT)), comprise very low wall drag as witnessed by low Beta, but remarkably also comprise very high batch stiffness as witnessed by relatively high Tau Y, such that excellent shape control is retained.

In particular, as shown in Table 8 below, high ratios of Tau Y/Beta are also achieved by using the batch compositions described herein. Ratios of Tau Y/Beta≥3.0, Tau Y/Beta≥3.5, Tau Y/Beta≥4.0, or even Tau Y/Beta≥4.5 may be achieved using the batch compositions described herein. In some embodiments, Tau Y≥10.0, Tau Y≥14.0, or even Tau Y≥18.0 may be achieved. In some embodiments, Beta≤5.0, Beta≤4.0, or even Beta≤3.5 may be achieved.

In exemplary embodiments wherein the pore-former spheroidal particles 206 are non-hydrophilic, relatively low Beta (e.g., Beta≤5.0) and relatively high Tau Y (Tau Y≥8.0) may be achieved such that excellent shape control is retained, yet lower LV % (e.g., LV≤35% (SAT), LV≤30% (SAT), or even LV≤25% (SAT),)) may be used thus providing lower loss on drying and inherently higher batch stiffness for comparable levels of hydrophilic pore-former.

Determination of Tau Y and Beta

Homogeneous ceramic batch compositions comprising pastes were made from the mixture of batch inorganics (pre-reacted inorganic spheroidal particles, and "fines"), pore-former particles, organic binders, LV (e.g., deionized water), and optional lubricants by high-shear mixing the various ingredients in a Brabender mixer (commercial Brabender Plastograph EC 3.8 kW, 200 NM/150 min equipped with mixer type 359). In some embodiments, a stiffness of the paste was measured with a penetrometer to ensure the proper paste consistency. A commercial penetrometer ESM-301E motorized test stand with digital force gauge was used.

Figure 9:
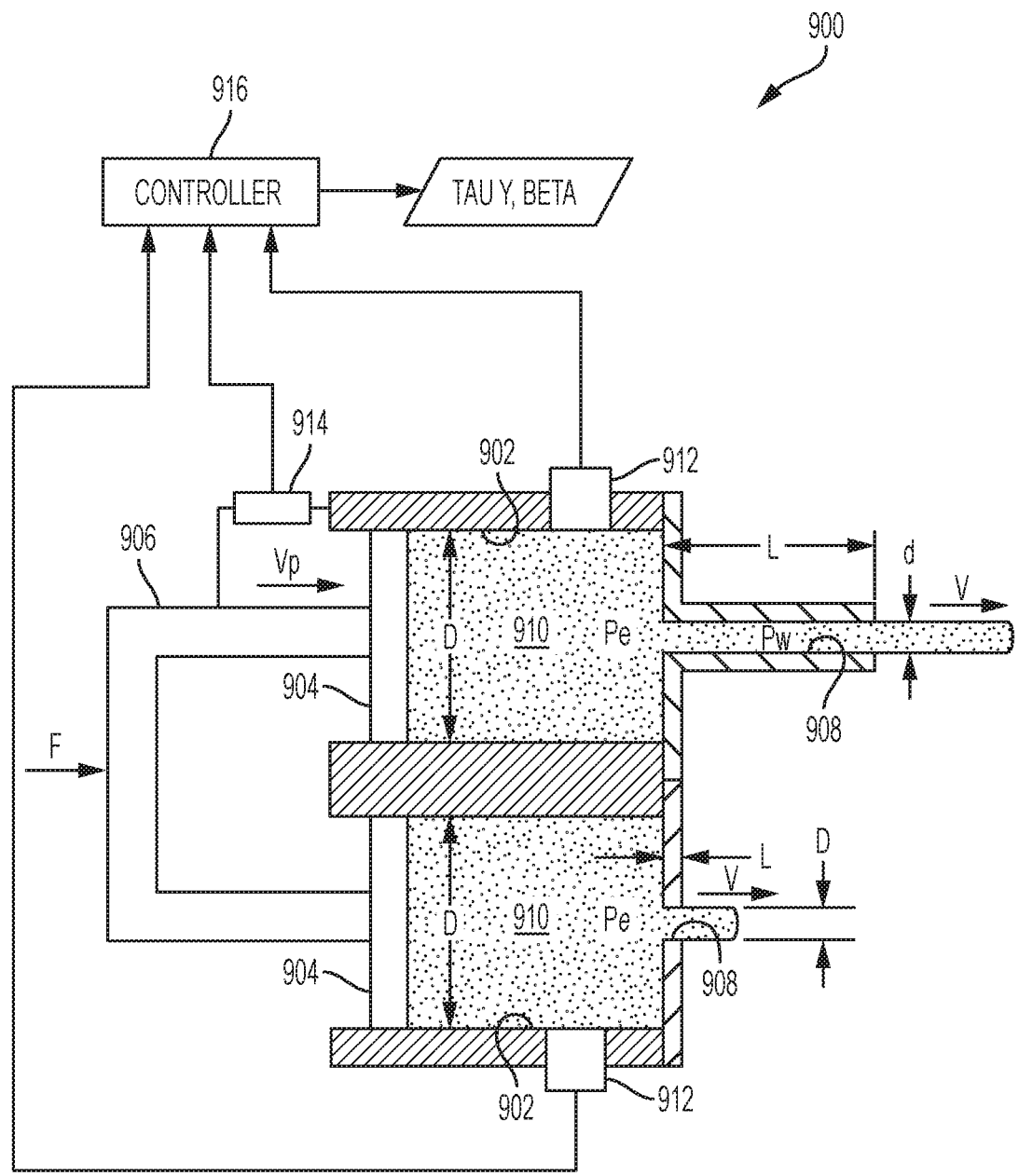
FIG. 9 illustrates a cross-sectioned side view of a capillary rheometer configured to test rheological properties of the batch composition according to embodiments.

Paste flow characteristics of the batch composition are measured using a commercial dual-bore capillary rheometer (hereinafter "capillary rheometer") with instrumented pistons and multiple capillary lengths. Both batch stiffness and wall drag may be simultaneously measured on the capillary rheometer. An example of the capillary rheometer 900 is shown in FIG. 9.

The capillary rheometer 900 used comprises multiple cylindrical-shaped barrels 902 comprising a diameter D of 16 mm and several capillaries 908 of different length L with a small circular bore hole having a capillary diameter d of 1 mm. Capillary lengths L ranged from 0 mm to 16 mm, and in particular 0 mm (actually for practicality 0.25 mm), 4 mm, 10 mm, and 16 mm. Disc-shaped pistons 904 were mounted for translational motion in the barrels 902 when a force F is exerted on the pistons 904 such as by exerting a force F on a crossmember 906 interconnected to each of the pistons 904. After being mixed as discussed above, the batch composition 910 comprising a paste is inserted in, and is extruded from, the barrels 902 of the capillary rheometer 900 into and through the capillaries 908 under a various levels of force F thus producing the different velocities V. A representative pressure drop Ptotal across the capillary rheometer 900 is determined by measuring pressure Ptotal and velocity Vp supplied to the pistons 904 that contact and cause extrusion of the batch composition 910 through the capillaries 908. The total pressure Ptotal for each die (e.g., long and zero length dies are shown) is determined from pressure sensors 912 that measure the pressure Ptotal exerted on the batch compositions 910 contained in the barrels 902.

The velocity V of the batch compositions 910 in the capillaries 908 is related to the piston velocity Vp by representative ratios of the areas by the Eqn. 13 below:

$$V = Vp \, (D^2/d^2) \qquad \text{Eqn. 13}$$

The piston velocity Vp may be measured by a suitable displacement sensor 914 coupled between (i) the pistons 904 or crossmember 906 and (ii) either ground or the extruder body comprising the barrels 902. The total pressures Ptotal and piston velocity Vp may be provided to a suitable controller 916 comprising a suitable processor and memory configured sufficiently to carry out the calculations to be able to produce, as an output, Tau Y and Beta values of the batch composition.

Representative raw data from an exemplary capillary rate sweep test illustrating four capillaries 908 of different length L (L of 16 mm, 10 mm, 4 mm, and 0.25 mm) and capillary diameter d of 1 mm for different extrusion rates are shown in Table 4 below. Push rate of the piston 904 ("plunger") and extrusion rate coming out of the capillary ("noodle") as well as the total pressure Ptotal are provided for each length L.

TABLE 4

Velocities (V and Vp) versus total pressure (Ptotal)
for various capillary lengths (0.25 mm to 16 mm).

| capillary length × diameter | 16 × 1 | 10 × 1 | 4 × 1 | 0.25 × 1 |
|---|---|---|---|---|
| Plunger mm/min. | Noodle in/s | Pressure psi | Pressure psi | Pressure psi | Pressure psi |
| 27.09 | 4.000 | 1050.65 | 887.935 | 668.68 | 532.065 |
| 20.34 | 3.000 | 1022.885 | 859.665 | 641.165 | 506.98 |
| 13.55 | 2.000 | 990.445 | 825.89 | 610.52 | 478.39 |
| 10.16 | 1.500 | 969.825 | 806.985 | 592.005 | 460.7 |
| 6.77 | 1.000 | 943.895 | 781.86 | 565.715 | 437.86 |
| 5.08 | 0.750 | 924.095 | 768.915 | 549.07 | 422.345 |
| 3.39 | 0.500 | 899.15 | 753.52 | 526.07 | 401.455 |
| 1.69 | 0.250 | 853.695 | 736.04 | 486.38 | 366.23 |

TABLE 4-continued

Velocities (V and Vp) versus total pressure (Ptotal)
for various capillary lengths (0.25 mm to 16 mm).

| capillary length × diameter | 16 × 1 | 10 × 1 | 4 × 1 | 0.25 × 1 |
|---|---|---|---|---|
| Plunger mm/min. | Noodle in/s | Pressure psi | Pressure psi | Pressure psi | Pressure psi |
| 0.68 | 0.100 | 767.51 | 692.805 | 426.565 | 321.725 |
| 0.05 | 0.007 | 479.09 | 522.195 | 275.49 | 226.915 |

When the shortest capillary 908 having a length L of 0.25 mm long (or approx. 0 mm long) is used for extrusion, then the batch composition 910 has to adapt its shape from the relatively-large diameter D of the barrel 902 (16 mm) to a relatively-small diameter d of the capillary 908 (1 mm). The pressure drop Ptotal across this capillary 908 ("approx. zero capillary") corresponds to batch stiffness via the pressure required for the geometrical contraction of the batch composition from the 16 mm barrel to the 1 mm capillary 908. Use of the "approx. zero capillary" may be indicative of, and may be used to determine, entry loss components, as its short length (approx. L=0) minimizes the wall drag component so that it can effectively be ignored. Use of a longer capillary (for example, the 16 mm long capillary) produces both a wall drag component due to friction/drag along the length L of the wall of the capillary 908 and stiffening of the batch composition due to the change in its shape, i.e. entry loss component. Thus, the measured pressure drop Ptotal as a function of velocity V may contain both an entry loss component Pe and a wall drag component Pw, which are separable as will be apparent.

The batch compositions were tested with capillary rate sweep tests for the different length capillaries of capillary length L (0 mm to 16 mm) at 10 different velocities V (effectively velocity (V) from 0 mm/sec to 4 in/sec (101.6 mm/sec)) and at a constant temperature of about 25° C. The extrusion velocity V (noodle) through the capillary 908 was stepped up to successively higher velocities V, and the representative total pressure drop (Ptotal) was recorded for each step via sensors 912 when a steady state velocity V was reached. This raw Ptotal and velocity V data for each length L of capillary 908 were provided to controller 916, stored in memory and further calculations as described herein are undertaken to calculate Tau Y and Beta for each measured batch composition. Example values are shown in Table 5 below for one batch composition.

TABLE 5

L/d, Noodle Velocity V, Tw, Pe, Pe-avg, and Pe-intercept
Noodle Velocity (in/sec)

| L/d | 4.00 | 3.00 | 2.00 | 1.50 | 1.00 | 0.75 | 0.50 | 0.26 | 0.10 | 0.007 |
|---|---|---|---|---|---|---|---|---|---|---|
| 16 | 1051 | 1023 | 990 | 970 | 944 | 924 | 899 | 854 | 768 | 479 |
| 10 | 888 | 860 | 826 | 807 | 782 | 769 | 754 | 736 | 693 | 522 |
| 4 | 669 | 641 | 611 | 592 | 566 | 549 | 526 | 486 | 427 | 275 |
| 0.25 | 532 | 507 | 478 | 461 | 438 | 422 | 401 | 366 | 322 | 227 |
| Tw | 8.30 | 8.26 | 8.19 | 8.15 | 8.12 | 8.07 | 8.05 | 8.00 | 7.49 | 4.67 |
| Pe | 520 | 494 | 466 | 448 | 424 | 408 | 384 | 342 | 288 | 181 |
| Pe | 556 | 529 | 498 | 481 | 457 | 446 | 432 | 416 | 393 | 336 |
| Pe | 536 | 509 | 479 | 462 | 436 | 420 | 397 | 358 | 307 | 201 |
| Pe | 524 | 499 | 470 | 453 | 430 | 414 | 393 | 358 | 314 | 222 |
| Pe - avg | 534 | 508 | 478 | 461 | 437 | 422 | 402 | 369 | 326 | 235 |
| Pe- intercept | 534 | 508 | 478 | 461 | 437 | 422 | 402 | 369 | 326 | 235 |

Figure 10:
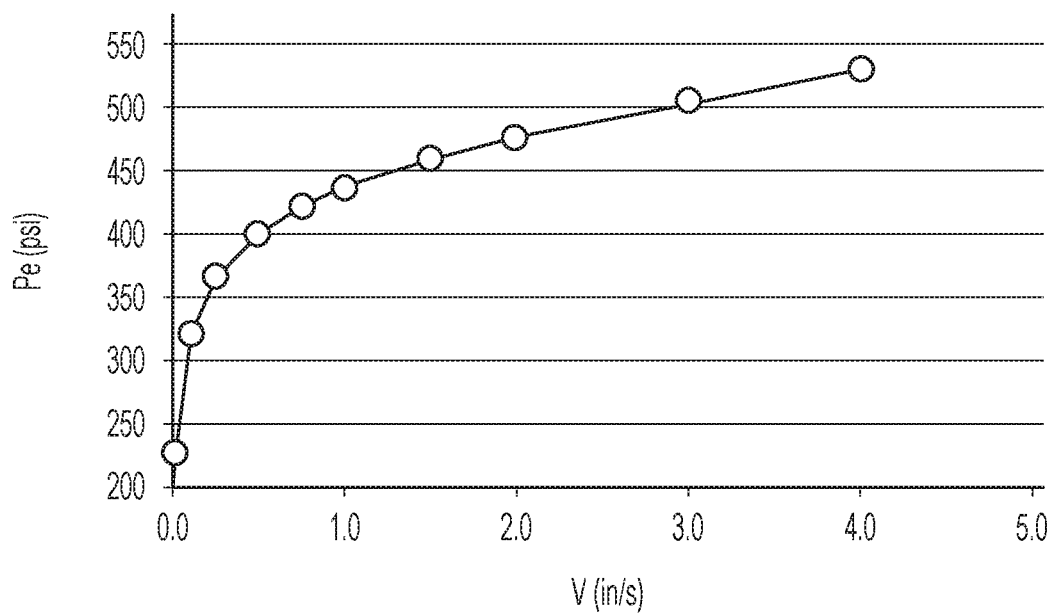
FIG. 10 illustrates an exemplary plot of entry pressure Pe (psi) versus Velocity (in/s) of an example embodiment of a batch composition comprising pre-reacted inorganic spheroidal particles.

As shown in FIG. 10, a plot of entry pressure Pe (psi) versus velocity V (in/s) is shown and illustrates the nonlinearity of the entry pressure loss as a function of velocity V provided by the zero length (0.25 in) capillary 908.

Figure 7A:
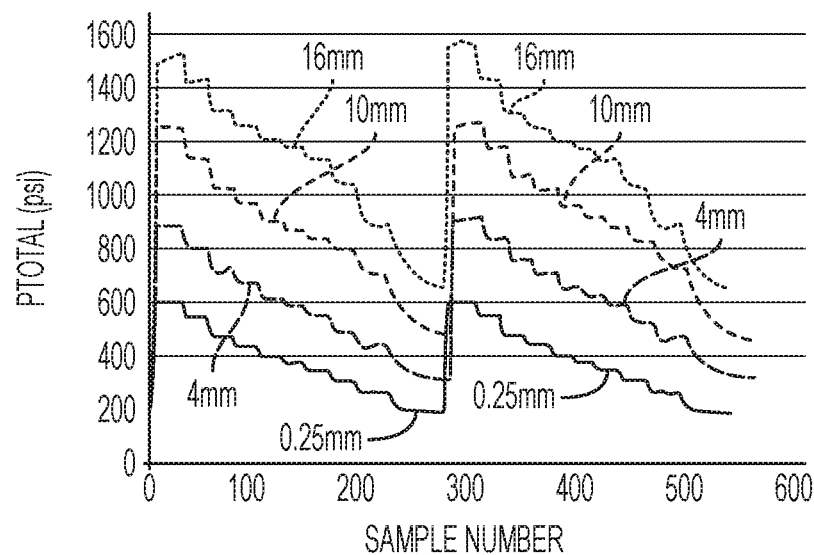
FIG. 7A illustrates a plot of Ptotal (psi) versus Sample Number of an example embodiment of a comparative batch composition comprising reactive particles at multiple velocities V and for different capillary lengths L.
Figure 7B:
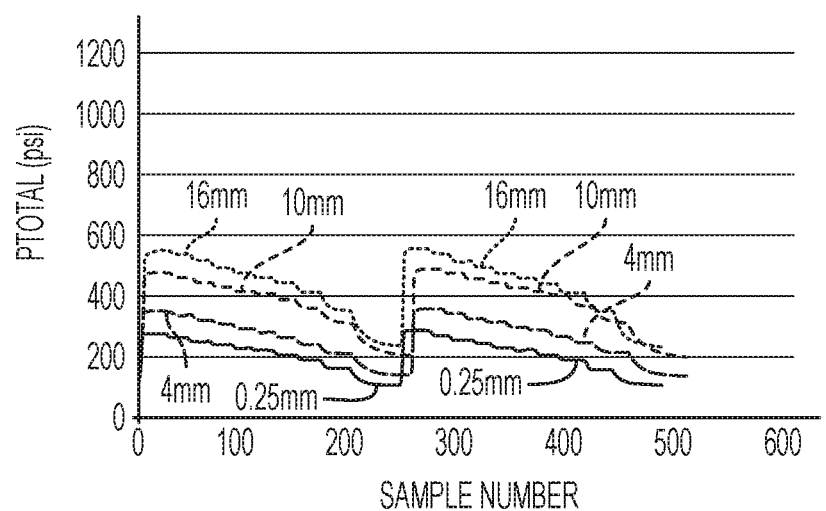
FIG. 7B illustrates a plot of Ptotal (psi) versus Sample Number of an example embodiment of a batch composition comprising pre-reacted inorganic spheroidal particles at multiple velocities V and for different capillary lengths L.
Figure 8A:
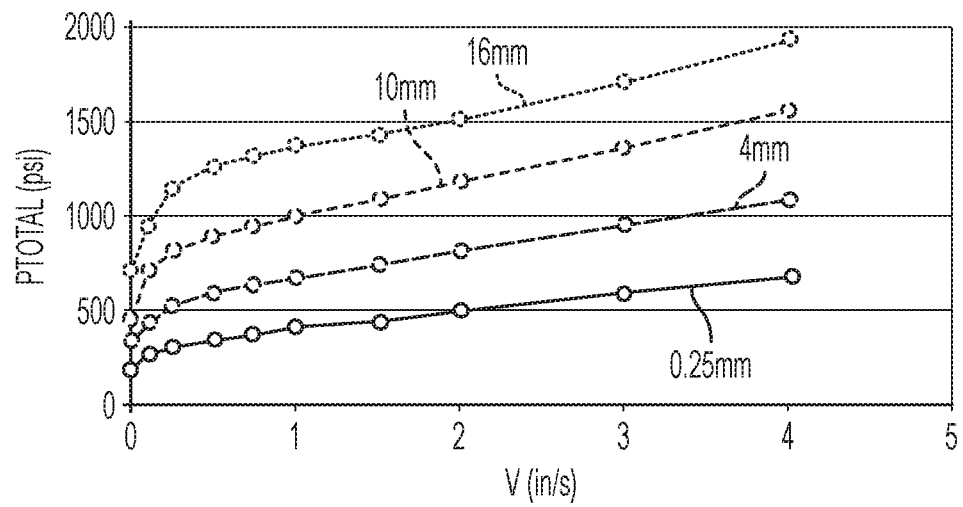
FIG. 8A illustrates a plot of Ptotal (psi) versus V (in/s) of an example embodiment of a comparative batch composition comprising reactive particles extruded through different capillary lengths L of a capillary rheometer.
Figure 8B:
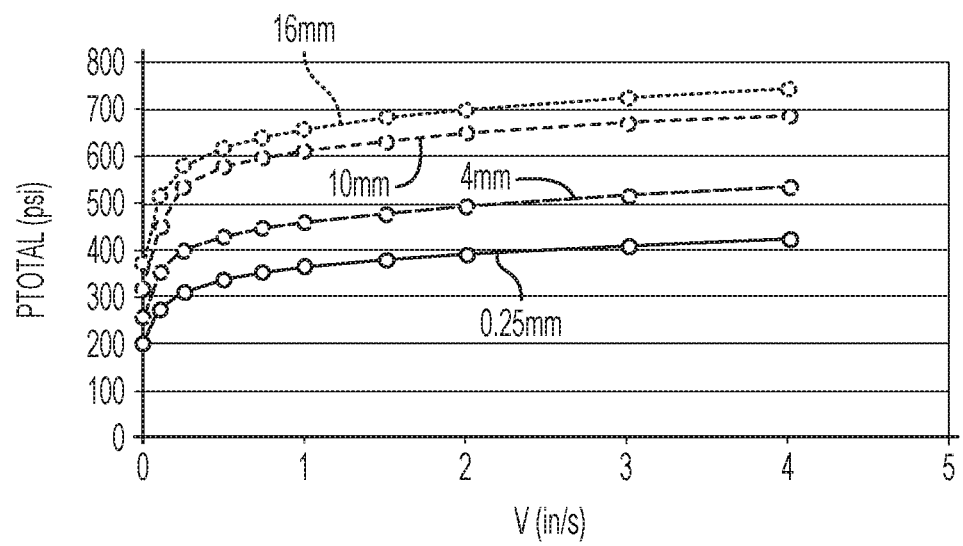
FIG. 8B illustrates a plot of Ptotal (psi) versus V (in/s) of an example embodiment of a batch composition comprising pre-reacted inorganic spheroidal particles extruded through different capillary lengths L of a capillary rheometer.

Representative examples of raw data output from the capillary rate sweep test with the four different capillaries and ten velocities is shown in FIG. 7B illustrating test values for a batch composition comprising pre-reacted inorganic spheroidal particles at multiple steps and multiple curves, each corresponding to one capillary length (with larger L values illustrating higher pressures). FIG. 7A shows a representative conventional reactive batch composition, wherein both FIG. 7A and FIG. 7B are set to the same scale to show the relatively-large difference in total pressure (psi) between conventional batch compositions and the batch composition comprising an exemplary embodiment of pre-reacted inorganic spheroidal particles using the same test procedure. The raw data may be converted into pressure vs. velocity plots by using any suitable software program. The pressure versus velocity plots are shown in FIG. 8A and FIG. 8B for conventional (reactive) cordierite mullite aluminum titanate (CMAT) reactive batch compositions (FIG. 8A) versus spray-dried pre-reacted CMAT batch compositions (FIG. 8B) according to some embodiments.

As discussed above, the total measured pressure drop Ptotal is equal to the entry pressure Pe plus the wall drag contribution Pw and can be represented by the relationship:

$$Ptotal = Pe + Pw$$

Numerous models have been developed that relate the pressure drop of the batch composition 910 in the capillary rheometer 900 across the geometrical contraction from D to d and through the capillary 908 to the batch rheology. Capillary characteristics comprise the capillary diameter d, capillary length L, and constants that comprise aspects related to the capillary material and the capillary surface roughness, but that do not change for a given capillary 908 of given length L and diameter d. The testing methods described herein are used to determine batch rheological characteristics comprising Tau Y (yield stress) and the Beta (wall drag coefficient) which are unique parameters that define rheological properties of the various batch compositions described herein.

The Benbow-Bridgwater model is used to describe wall drag Pw as a function of capillary length L, capillary diameter d, velocity V, wall drag coefficient β (Beta), and wall velocity exponent m [See references: J. Benbow, J. Bridgwater, Paste flow and extrusion, Oxford University Press, 1993 and J. J. Benbow, E. W. Oxley, J. Bridgwater "The extrusion mechanics of pastes—the influence of paste formulation on extrusion parameters"; Chemical Eng. Science 53, 2151 (1987)]. The model characterizes wall drag Pw as Eqn. 14 below:

$$Pw = \{4L/d\} [\beta V^m] \quad \text{Eqn. 14}$$

where:
L is the capillary length
d is the capillary diameter
β (Beta) is the wall drag coefficient
m is the wall velocity exponent
V is the paste velocity at the wall
But the shear stress at the wall Tw is as shown in Eqn. 15 below:

$$Tw = \beta V^m \quad \text{Eqn. 15}$$

Thus the wall drag pressure component can be expressed as Eqn. 16 below:

$$Pw = (4L/d) Tw \quad \text{Eqn. 16}$$

The natural log of shear stress (Ln (Tw)) is plotted against the natural log of velocity (Ln(V)). From this plotted data, the term β can be extracted as the y-intercept of the Ln(Tw) and Ln(V) plot, and m is the slope of that line. The slope m is determined over the length data from 0 in/s to 4 in/s. Outliers are ignored, and the test should be run multiple times and the results averaged for each batch composition.

The entry pressure Pe can be approximated by Eqn. 17 below:

$$Pe = 2\{TauY + kV^n\} \{Ln (D/d)\}tm \quad \text{Eqn. 17}$$

Given that Ptotal=Pe+Pw, then the model defines the total pressure P as shown in Eqn. 18 below:

$$Ptotal = 2 \{TauY + kV^n\} \{Ln(D/d)\} + \{4L/d\} [\beta V^m] \quad \text{Eqn. 18}$$

where:
Tau Y is the yield stress of the batch composition
k is a consistency Index
n is the bulk velocity exponent
D is the extruder barrel diameter
d is the capillary diameter
L is the capillary length
β (Beta) is the wall drag coefficient
m is the wall velocity exponent
V is the paste velocity at the wall The values of Tau Y, k, and n can be extracted from the measured data through a three-parameter curve fit through the use of a solver, such as the solver provided in Excel or any other iterative solver, in order to minimize the difference between the measured and calculated parameters. The values of Tau Y and β (Beta) are parameters used herein to characterize the extrusion rheological properties of the batch compositions described herein and are calculated as described above. From this measured raw data, controller 916 calculates both Tau Y and Beta.

Lubricants/Surfactants

The batch composition may further comprise a lubricant, such as an oil lubricant. Non-limiting examples of oil lubricants comprise tall oil, light mineral oil, corn oil, high molecular weight polybutenes, polyol esters, a blend of light mineral oil and wax emulsion, a blend of paraffin wax in corn oil, combinations of the aforementioned, and the like. The amount of lubricant may be from about 0.5 wt % SAT to about 5 wt % SAT. In an exemplary embodiment, the oil lubricant may be tall oil present from about 0.5 wt % SAT to about 2.5 wt % SAT in the batch composition.

Furthermore, the batch composition may comprise a surfactant, especially cordierite forming batch compositions. Non-limiting examples of surfactants that can be used in the batch composition are $C_8$ to $C_{22}$ fatty acids and/or their derivatives. Additional surfactant components that can be used with these fatty acids are $C_8$ to $C_{22}$ fatty esters, $C_8$ to $C_{22}$ fatty alcohols, and combinations of these. Exemplary surfactants are stearic, lauric, myristic, oleic, linoleic, palmitoleic acids, and their derivatives, stearic acid in combination with ammonium lauryl sulfate, combinations of any of the aforementioned and the like. The amount of surfactants typically may be from about 0.25 wt % SAT to about 2 wt % SAT in the batch composition.

Phase Composition

In more detail, the pre-reacted inorganic spheroidal particles comprise particles that are pre-fired to comprise the desired crystalline phase composition prior to being added to the batch composition. The porous ceramic honeycomb produced with the pre-reacted particles may have an engineered particle size distribution and also inorganic phase composition. The resultant fired porous ceramic honeycomb body may be characterized by containing crystalline phases within the solid matter and the morphology may be characterized by the shape of the matter and the shape of the pores within the ceramic article. By way of example, and not by limitation, the pre-reacted inorganic spheroidal particles may comprise one or more phase compositions. In many embodiments, at least a two-phase composition is provided, such as a primary phase and a secondary or minor phase. Optionally, the pre-reacted particles may comprise more than one secondary or minor phase.

Example Batch Compositions

Examples of batch compositions comprising certain pre-reacted inorganic spheroidal particles, pore-former spheroidal particles, and "fines" are shown in Tables 6 and 7 shown below. Rheology performance is shown in Table 8. The amount and types of "fines" that may be present in the batch composition are discussed above. In the depicted embodiments, a phase composition of the pre-reacted inorganic spheroidal particles comprises CMAT and comprises a major phase of a solid solution of aluminum titanate with magnesium dititanate, a second phase of cordierite, some mullite, and may also comprise a glass phase. As will be apparent, however, other crystalline phase compositions of the pre-reacted inorganic spheroidal particles may be manufactured.

TABLE 6

CMAT Batch Composition Examples

| | Pre-reacted Inorganics | | | Fines in inorganics | | |
|---|---|---|---|---|---|---|
| | | | | Fine | Fine Talc | Ludox Contains 40% | |
| Ex. # | SPD/ Pre-reacted CMAT | % | $DI_{50}$ (μm) | Alumina % SAP | % SAP | $SiO_2$ % SAP | "fines" % SAP |
| 1 | AD1350 C./6 h | 100 | 40 | 2 | 3 | 3.8 | 6.5 |
| 2 | AD1350 C./6 h | 100 | 40 | 2 | 3 | 3.8 | 6.5 |
| 3 | AD1350 C./6 h | 100 | 40 | 2 | 3 | 3.8 | 6.5 |
| 4 | AD1350 C./6 h | 100 | 40 | 2 | 3 | 3.8 | 6.5 |

TABLE 7

Binder, Lubricant, and LV %

| Ex. # | Pore-Former #1 Polymer Spheroids wt % SAT | Pore-Former #2 Polymer Spheroids wt % SAT | Cellulose Binder TYA Methylcellulose wt % SAT | F240 wt % SAT | Tall Oil wt % SAT | LV % wt % SAT |
|---|---|---|---|---|---|---|
| 1 | 12.1 | 0 | 3.8 | 1.9 | 1 | 24.1 |
| 2 | 12.1 | 0 | 3.8 | 1.9 | 1 | 22.5 |
| 3 | 0 | 12.1 | 3.8 | 1.9 | 1 | 35.0 |
| 4 | 0 | 12.1 | 3.8 | 1.9 | 1 | 29.5 |

TABLE 8

Rheology Performance of Example Batch Compositions

| | Pre-reacted Inorganics | | | Rheology | | |
|---|---|---|---|---|---|---|
| Ex. # | SPD/ Pre-reacted CMAT | % | $DI_{50}$ (μm) | Tau Y | Beta | Tau Y/Beta |
| 1 | AD 1350 C./6 h | 100 | 40 | 14.52 | 3.20 | 4.54 |
| 2 | AD1350 C./6 h | 100 | 40 | 18.87 | 4.06 | 4.64 |
| 3 | AD1350 C./6 h | 100 | 40 | 10.96 | 3.35 | 3.27 |
| 4 | AD1350 C./6 h | 100 | 40 | 16.96 | 4.26 | 3.98 |

Embodiments above comprise several different sizes of pore-former spheroidal particles. Pore-former 1 comprises non-hydrophilic polymer pore-former spheroidal particles having a $DP_{50}$ of 25.8 μm and pore-former 2 comprises non-hydrophilic polymer pore-former spheroidal particles having a $DP_{50}$ of 17.1 μm. However, other spheroidal pore-former particles within the range of sizes described by Eqns. 4, 5, and 6 above may be used. Further, other weight percentages SAT may be used depending upon the desired porosity in the porous ceramic article (e.g., porous ceramic honeycomb body).

Ceramic Articles Produced

Porous ceramic articles (e.g., porous honeycomb bodies) produced from drying and firing of green body articles (e.g., green honeycomb bodies) manufactured using the batch composition, may comprise any desired final ceramic composition. For example, the final phase composition of the ceramic article may comprise aluminum titanate-based compositions, such as aluminum titanate solid solution (pseudobrookite) as the main phase (greater than 50 vol %) and other phases such as cordierite, feldspar, mullite, spinel, alumina, rutile, or similar oxides as a secondary and/or additional phase. In other embodiments, the final ceramic composition of the porous ceramic articles may comprise cordierite, or other oxide or non-oxide ceramics, comprising metals, intermetallics, mullite, alumina ($Al_2O_3$), zircon, alkali and alkaline-earth alumino-silicates, spinels, perovskites, zirconia, ceria, silicon oxide ($SiO_2$), silicon nitride ($Si_3N_4$), silicon aluminum oxynitride (SiAlON), and zeolites.

Porous ceramic articles formed from the batch compositions comprising combinations of pre-reacted spheroidal particles and pore-former spheroidal particles according to exemplary embodiments of the present disclosure may be used to manufacture diesel particulate filter (DPF), gasoline particulate filter (GPF), partial filters, catalyst support, catalyst substrates, and combined substrate and particulate filter apparatus. Porous ceramic articles made from batch compositions with pre-reacted inorganic spheroidal particles may exhibit relatively large pore size and high porosity, good strength and low coefficient of thermal expansion (CTE) that enable low clean pressure drop as well as low pressure drops at high wash coat and catalyst loading. Thus, exemplary embodiments of the present disclosure enable integration of high selective catalytic reduction (SCR) catalyst loading and/or high de-$NO_x$ catalyst efficiency while providing low pressure drop, high filtration efficiency, and good thermal shock resistance.

Manufacture of Honeycomb Bodies

Figure 3:
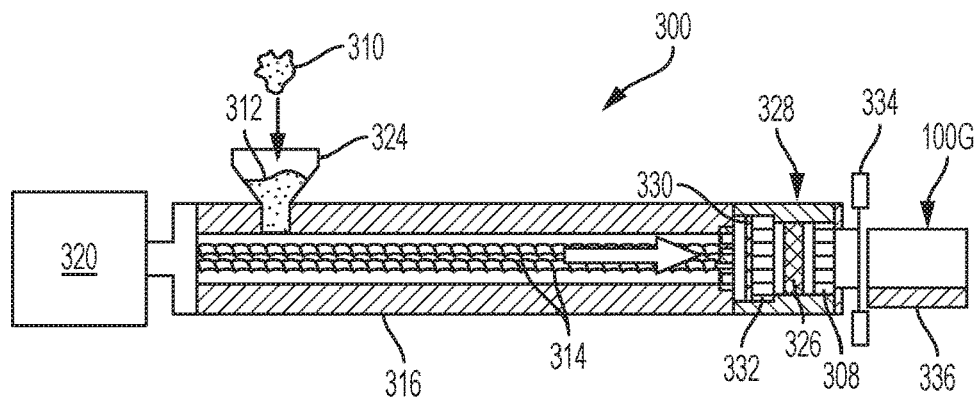
FIG. 3 illustrates a schematic, partially cross-sectioned side view of an extruder configured to produce green honeycomb bodies using the batch composition according to one or more embodiments.

Exemplary embodiments of the present disclosure also provide a process for making a honeycomb body 100 (FIG. 1) by using a batch composition comprising a combination of pre-reacted inorganic spheroidal particles, pore-former spheroidal particles provided in the defined relative sizes described herein, together with "fines." In the manufacture of such honeycomb bodies 100, the batch composition (as described herein), which may be considered a non-ideal mixture, may be extruded through an extruder 300 shown in FIG. 3. The extruder 300 comprises an extrusion die 308 having an array of thin intersecting slots formed in the desired cell shape. Any suitable cell shape may be used, such as square, rectangular, triangular, hexagonal, and the like. The dry batch composition of pre-reacted inorganic spheroidal particles 203, "fines", and pore-former spheroidal particles 206 are joined with an organic binder, the liquid vehicle (LV), possibly an oil lubricant, and possibly a surfactant, and is plasticized by mixing and/or mulling the components to produce at least a partially-plasticized batch. The at least partially-plasticized batch is then fed to the extruder 300, such as a twin screw extruder. "Plasticized" as used herein means a property of a batch mixture that comprises an LV (e.g., de-ionized water) and possibly a lubricant and surfactant that has been mixed and/or mulled to have a paste consistency.

The batch composition may be initially mixed/mulled by any suitable mixing apparatus or combination of mixing apparatus, such as with a muller, auger mixer, double arm mixer, or plow blade mixer, or the like, to begin plasticization. The LV may be added to hydrate the pre-reacted inorganic spheroidal particles, "fines," the pore-former spheroidal particles, the organic binder, along with the lubricant and /or surfactant to wet out the organic binder and pre-reacted inorganic spheroidal particles and pore-former spheroidal particles, and to form a partially-plasticized batch composition.

The plasticized batch composition may be configured as a pug of material 310 that may be intermittently fed to the extruder 300, or as a continuous or semi-continuous supply stream of smaller amounts of material, such as small pugs or even granules or streams of partially-plasticized batch composition. The plasticized batch composition 312 that has been mixed and/or mulled, and that is in a proper form and consistency can be supplied to the extruder 300. Further, although the extrusion process is described herein, as an option, the batch composition may be suitably shaped into a green honeycomb body 100 from the plasticized batch composition by other suitable shaping processes, such as by uniaxial or isostatic pressing, injection molding, or the like.

Again referring to FIG. 3, the partially-plasticized batch composition 312 may be shaped into a green honeycomb body 100G by being provided to, and extruded from, the extruder 300. Extrusion may be performed with any suitable type of extruder 300 that provides a suitable amount of shear to the batch composition 312. For example, a hydraulic ram extruder, a two-stage de-airing single auger, a single-screw extruder, or a twin-screw extruder, or the like may be used. Other types of extruders may be used.

In more detail, the extruder 300 may comprise a screw section comprising one or more extruder screws 314 (two shown) rotatable within an extruder barrel 316. The one or more extruder screws 314 may be driven by motor 320 at the inlet end of the extruder barrel 316. In the twin-screw embodiment, the extruder 300 may comprise two side-by-side extruder screws 314. Extruder barrel 316 may be provided with an inlet port 324 configured to allow introduction of the batch composition 312, to be further plasticized. An optional mixer plate 326 may be positioned downstream of the screw section and upstream of the extrusion die 308 and may be contained within cartridge 328 mounted on the outlet end of the extruder barrel 316. After screw section, mixer plate 326 may operate to further mix, homogenize, and plasticize the batch composition 312.

Also disposed within cartridge 328 may be filter screen 330 and filter screen support 332, both positioned upstream of the extrusion die 308 with respect to the flow direction (shown as a directional arrow) of batch composition 312 being pumped by the extruder screws 314. Filter screen 330 is mounted against filter screen support 332 to form filter assembly configured to remove large particles, agglomerates, or debris that might otherwise plug or impede flow through the extrusion die 308. In some embodiments, filter screen support 332 is formed having a plurality of openings and/or slots therein. The extrusion die 308 comprises a plurality of upstream feedholes and a plurality of downstream intersecting thin slots. Flow of the plasticized batch composition 312 through the plurality of intersecting thin slots of the extrusion die 308 forms the matrix of intersecting walls 102 and channels 104 in the green honeycomb body 100G. Examples of extrusion dies and method of manufacture are described in US 2017/0120498; US 2008/0124423; and U.S. Pat. No. 8,591,287, for example. Other suitable extrusion dies may be used.

Thus, during operation of the extruder 300, plasticized batch composition 312 is pumped from extruder barrel 316 by the one or more extruder screws 314 and then passes through filter screen 330, filter screen support 332, and optional mixer plate 326, and finally out of the extrusion die 308 of the extruder 300 as a green honeycomb body 100G. The green honeycomb body 100G may be transversely cut to length by a cutting apparatus 334 comprising a cutting implement, such as a wire. Once cut, the green honeycomb body 100G may be received and supported on a tray 336, such as the tray disclosed in US 2015/0273727, for example. Other suitable tray construction may be used.

The wet green honeycomb body 100G may then be dried by being transported on the tray 336 by a conveyor (not shown) to a dryer (not shown) and dried by any suitable drying process, such as oven drying, microwave drying, RF drying, combinations thereof, or the like to form a dried green body honeycomb. Suitable drying processes and devices are described in U.S. Pat. Nos. 9,429,361; 9,335,093; 8,729,436; 8,481,900; 7,596,885; 5,406,058; and US 2014/0327186, for example.

Firing

The dried green body honeycomb can then be fired according to known firing techniques, to form a porous ceramic honeycomb body 100, as is shown in FIG. 1. For example, the dried green body honeycomb may be fired in a gas or electric kiln under conditions effective to convert the dried green honeycomb body into a ceramic article (e.g., a porous ceramic honeycomb body 100). The firing conditions of temperature and time depend on the specific batch composition and size and geometry of the dried green body honeycomb, for example.

In some embodiments, the firing conditions effective to convert the dried green body honeycomb into a porous ceramic honeycomb body 100 can comprise heating the dried green body honeycomb in an air atmosphere in a furnace at heating rates of between 50° C./hour and 300° C./hour depending on the size, shape, and composition to a maximum soak temperature in the range of from 1000° C. to 1600° C., for example, depending upon the batch composition used. The maximum soak temperature may be maintained for a hold time of between about 1 hour to about 30 hours sufficient to convert the dried green body honeycomb into a porous ceramic honeycomb body 100. This may be followed by cooling at a rate sufficiently slow (e.g., a cool down rate of about 10° C./hour to about 160° C./hour) so as not to thermally shock and crack the porous ceramic honeycomb body 100. Firing times further depend on factors such as kinds and amounts of pre-reacted inorganic spheroidal particles, inorganic "fines", organic binder, and pore-former spheroidal particles in the batch composition, and the nature of firing equipment, but total firing times may be from about 20 hours to about 80 hours, for example.

For batch compositions that are primarily for forming aluminum titanate, the top firing temperatures are from about 1,320° C. to about 1,550° C., and the holding times at these temperatures are from about 1 hour to about 6 hours.

For batch compositions that are primarily for forming aluminum titanate-mullite, the top firing temperatures are from about 1,350° C. to about 1,450° C., and the holding times at these temperatures are from about 1 hour to about 6 hours.

For batch compositions that are primarily for forming cordierite-mullite, aluminum-titanate (CMAT), the top firing temperature is from about 1,300° C. to about 1,380° C., and the holding times at this temperature is from about 1 hour to about 6 hours.

For batch compositions that are primarily for forming mullite, the top firing temperature is from about 1400° C. to about 1600° C., and the holding time at this temperature is from about 1 hour to about 6 hours, For cordierite-mullite forming mixtures which yield cordierite-mullite, the top firing temperature is from about 1375° C. to about 1425° C., and the holding times at this temperature is from about 1 hour to about 6 hours.

For example; in compositions which are primarily for forming cordierite, the top firing temperature is from about 1300° C. to about 1450° C., and the holding time at this temperature is from about 1 hour to about 6 hours.

Suitable examples of firing processes and apparatus are described in U.S. Pat. Nos. 9,452,578; 9,221,192; 8,454,887; 8,187,525; 6,551,628; 6,325,963; 6,287,509; 6,207,101; 6,089,860; 6,048,199; and 6,027,684 for example. Other suitable firing processes and apparatus may be used.

Figure 6:
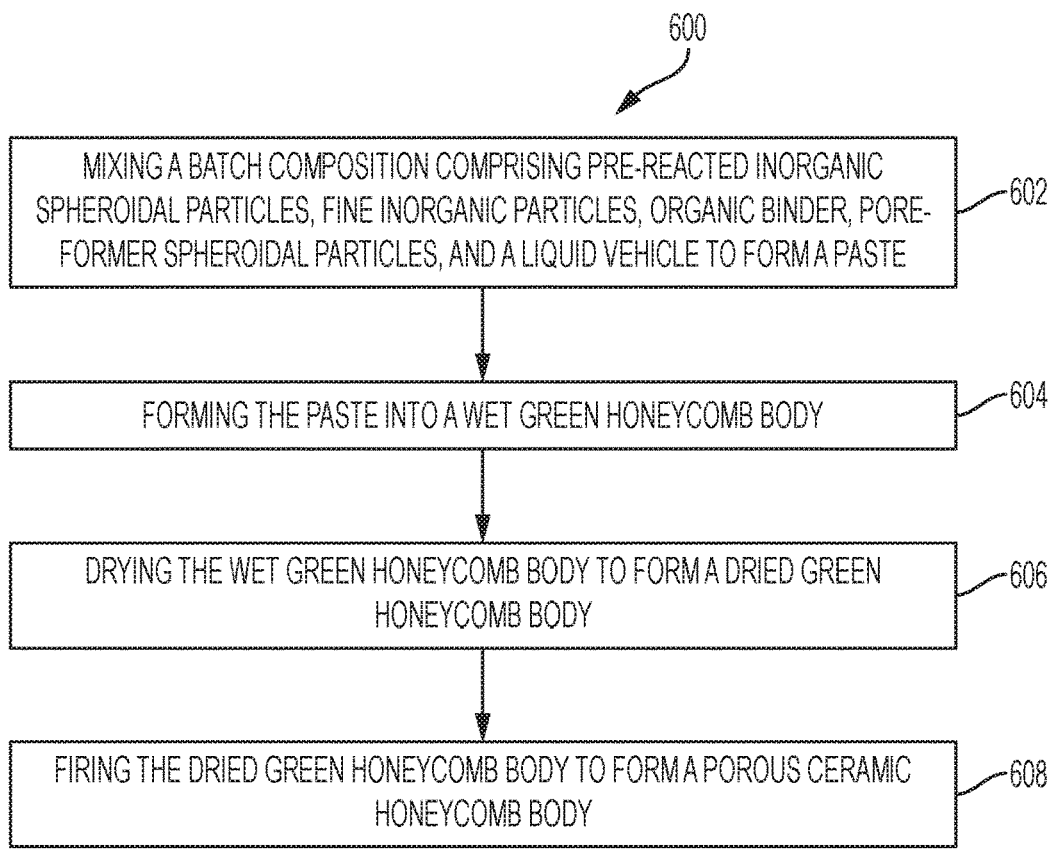
FIG. 6 illustrates a flowchart of method of manufacturing a porous ceramic honeycomb body using pre-reacted inorganic spheroidal particles and pore-former spheroidal particles according to exemplary embodiments of the disclosure.

Thus, one or more embodiments of the disclosure provide a method of manufacturing a honeycomb body. As shown in FIG. 6, an exemplary embodiment of the method 600 comprises, in 602, mixing a batch composition comprising pre-reacted inorganic spheroidal particles, fine inorganic particles ("fines"), organic binder, pore-former spheroidal particles, and a liquid vehicle (LV) to form a paste. In the batch composition, the pre-reacted inorganic spheroidal particles have a pre-reacted particle size distribution of:

$$10 \ \mu m \leq DI_{50} \leq 50 \ \mu m, \text{ and } DIb \leq 2.0, \text{ and}$$

the pore-former spheroidal particles have a pore-former particle size distribution of:

$$0.40 \ DI_{50} \leq DP_{50} \leq 0.90 \ DI_{50}, \text{ and } DPb \leq 1.32, \text{ and}$$

the fine inorganic particles ("fines") comprise less than 20 wt % having a median particle diameter of less than 5 μm based on the total weight or the pre-reacted inorganic spheroidal particles.

The method 600 further comprises, in 604, forming the paste into a wet green honeycomb body (e.g., green honeycomb body 100G), such as by extrusion through an extrusion die or other suitable forming process, and then, in 606, drying the wet green honeycomb body to form a dried green honeycomb body; and, in 608, firing the dried green honeycomb body to form a porous ceramic honeycomb body (e.g., porous ceramic honeycomb body 100).

Spray-Drying Process

According to exemplary embodiments of the disclosure, fine raw powders and soluble constituents may be mixed in a slurry with water, together with any organic binder, dispersant, surfactant, and/or anti-foam agent. The slurry may then be suspended in a carrier gas and atomized at the top of a spray dryer. Parameters discussed above may be varied to adjust particle size and particle size distribution. Fine raw powders, for example, particles of less than 1 μm, or soluble constituents may be used.

Solid, green spray-dried inorganic spheroidal particles of different median particle sizes, particle size distributions, and compositions may be made by using different settings of the spray-dryer and different starting raw materials according to exemplary embodiments of the disclosure. Green particles may be dense or contain different levels of porosity, ranging from nearly fully dense to porous.

According to exemplary embodiments alpha alumina or boehmite may be used as an alumina source, colloidal silica suspension may be used as a silica source, and fine magnesium oxide as a magnesia source for the raw materials. Other inorganic materials, such as strontium carbonate, calcium carbonate, and lanthanum carbonate may be jet-milled to less than 1 μm particle size and may optionally be added to the slurry. Lanthanum acetate, boron oxide, and other sintering aids may be added in the form of an aqueous solution to the slurry, for example. Other sintering aids may comprise lanthanum oxide, ceria, yttria, zirconia, boron oxide, alkali oxides, and the like.

Exemplary embodiments of combinations of inorganic raw material powders spray-dried to form green spheroidal particles comprise alumina (fine alpha alumina or boehmite) with 1.5% to 15% fine silica, alumina with different sinter additives such as B, Mg, Y, Fe, and the like, alumina-silica mixtures with different sinter additives such as B, Mg, La, Y, Fe, and the like, aluminum titanate (AT) compositions, feldspar compositions, aluminum titanate and feldspar compositions, CMAT compositions, and cordierite compositions, and the like.

Spray-dried green particles may be pre-fired at different temperatures and/or for different firing times in a box or tube furnace in a crucible, sinter box, or on a setter, or in a rotary calciner according to some exemplary embodiments. Conditions for static firing of alumina and silica-based dried green particles may comprise firing top temperatures between 1,200° C. and 1,600° C. and 1 hour to 15 hours hold time. Conditions for static firing of AT-based composition green particles may comprise temperatures between 1300° C. and 1600° C.

In a static setting, the green particles may sinter together at a high temperature and at long hold times and thus, may be broken apart prior to further use, for example, as a constituent of the batch composition. Sieving or low energy milling may be used to break the loosely-sintered agglomerates to form the pre-reacted inorganic spheroidal particles in some embodiments.

Rotation of green particles during pre-firing avoids sintering together and may provide better preservation of spheroidal shape. An industrial rotary calciner may be used for firing particles. For example, rotary calcining conditions of alumina and silica-based green particles may comprise, for example, 1,000° C.-1,650° C. As another example, rotary calcining conditions of AT spray-dried particles may comprise, for example, 1,000° C.-1,400° C. Other suitable calcining temperatures may be used.

Porous Ceramic Honeycomb Body

Various shapes and cell geometries of the final ceramic honeycomb body 100 produced from the batch composition of pre-reacted inorganic spheroidal particles, pore-former spheroidal particles, and "fines" may be provided. For example, the cell geometry of the porous ceramic honeycomb body 100 may have between about 100 cpsi (15.5 cells per square cm) and 1,200 cpsi (186 cells per square cm), for example. Furthermore, the porous ceramic honeycomb body 100 may comprise a transverse wall thickness of between about 0.008 inch (0.20 mm) and 0.03 inch (0.76 mm), for example. Various combinations of cell density and wall thickness may be produced using the batch composition, comprising 300 cells per square inch (cpsi) and wall thickness 0.014 inch wall thickness, which is conventionally described as a 300/14 cell structure. Other post-firing cell structures such as 300/10, 400/14, 600/9 suitable as a honeycomb filter or catalyst substrate may be used.

According to exemplary embodiments of the disclosure, a porous ceramic article may have a porosity greater than 30%, greater than 40%, greater than 50%, or even greater than 60%, depending upon the amount of pore-former spheroidal particles used in the batch composition. The porous ceramic honeycomb body 100 may have a median pore size ($d_{50}$) wherein $d_{50} \geq 10$ μm, for example, or even $d_{50} \geq 12$ μm, or even between 10 μm $\geq d_{50} \geq 30$ μm in some embodiments. The porous ceramic article may have a coefficient of thermal expansion from room temperature (25° C.) to 800° C. less than $20 \times 10^{-7} K^{-1}$, for example, less than $15 \times 10^{-7} K^{-1}$, or even less than $10 \times 10^{-7} K$. Porosity, median pore diameter and pore size distribution were determined by mercury intrusion porosimetry from an Autopore™ IV 9500 porosimeter with software from Micromeritics.

Reference throughout this specification to exemplary embodiments and similar language may, but do not necessarily, refer to the same embodiment. Furthermore, the described features, structure, or characteristics of the subject matter described herein with reference to any one embodiment may be used or combined in any suitable manner in additional described embodiments. In the description, numerous specific details are provided, such as examples of structures, processes, batch compositions, articles, etc., to provide a thorough understanding of embodiments of the subject matter. One skilled in the relevant art will recognize, however, that the subject matter may be practiced without one or more of the specific details, or with other methods, components, materials, and so forth. In other instances, well-known structures, materials, or operations are not shown or described in detail to avoid obscuring aspects of the disclosure.

The flowchart and method schematic diagrams described above are generally set forth as logical flowchart diagrams. As such, the depicted order and labeled steps are indicative of representative embodiments. Other steps and methods may be conceived that are equivalent in function, logic, or effect to one or more steps, or portions thereof, of the methods illustrated in the schematic diagrams. Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. Additionally, the order in which a particular method occurs may or may not strictly adhere to the order of the corresponding steps shown.

It will be apparent to those skilled in the art that various modifications and variations can be made in the present disclosure without departing from the scope of the disclosure. Thus, it is intended that the present disclosure cover the modifications and variations of this disclosure provided they come within the scope of the claims and their equivalents thereof.

What is claimed is:

1. A batch mixture, comprising:
   pre-reacted inorganic spheroidal particles having a pre-reacted particle size distribution wherein:

$10 \text{ μm} \leq DI_{50} \leq 50 \text{ μm}$, and $DIb \leq 2.0$; and pore-former spheroidal particles having a pore-former particle size distribution wherein:

$0.40 \, DI_{50} \leq DP_{50} \leq 0.90 \, DI_{50}$, and $DPb \leq 1.32$, and wherein each of $DI_{90}$, $DI_{50}$, and $DI_{10}$ is a coarse particle diameter, a median particle diameter, or a fine particle diameter, respectively, of the pre-reacted particle size distribution of the pre-reacted inorganic spheroidal particles in which 90%, 50%, or 10%, respectively, of the pre-reacted inorganic spheroidal particles have a diameter that is equal to or less than the coarse particle diameter, the median particle diameter, or the fine particle diameter, each of $DP_{90}$, $DP_{50}$, $DP_{10}$ is a coarse particle diameter, a median particle diameter, or a fine particle diameter, respectively, of the pore-former particle size distribution of the pore-former spheroidal particles in which 90%, 50%, or 10%, respectively, of the pore-former spheroidal particles have a diameter that is equal to or less than the coarse particle diameter, the median particle diameter, or the fine particle diameter, respectively, DIb is a breadth factor of the pre-reacted particle size distribution of the pre-reacted inorganic spheroidal particles and $DIb = \{DI_{90} - DI_{10}\}/DI_{50}$, and DPb is a breadth factor of the pore-former particle size distribution of the pore-former spheroidal particles and $DPb = \{DP_{90} - DP_{10}\}/DP_{50}$, and
   wherein the batch mixture comprises less than 20% of fine inorganic particles based on a total weight of the pre-reacted inorganic spheroidal particles, wherein the fine inorganic particles have a median diameter of less than 5 μm.

2. The batch mixture of claim 1, wherein the batch mixture comprises less than 5% of fine inorganic particles based on a total weight of the pre-reacted inorganic spheroidal particles, wherein the fine inorganic particles have a median diameter of less than 5 μm.

3. The batch mixture of claim 1, wherein the pore-former spheroidal particles have an $ARavg \leq 1.1$,
   wherein ARavg is an average aspect ratio defined as a largest width dimension divided by a smallest width dimension of the pore-former spheroidal particles, on average.

4. The batch mixture of claim 1, wherein the pore-former spheroidal particles are non-hydrophilic.

5. The batch mixture of claim 1, wherein the pore-former spheroidal particles comprise a non-hydrophilic polymer.

6. The batch mixture of claim 1, wherein the pore-former spheroidal particles comprises a phase change material.

7. The batch mixture of claim 1, wherein the pore-former spheroidal particles comprise a polymer having $MP \geq 100°$ C., wherein MP is a melting point of the pore-former spheroidal particles.

8. The batch mixture of claim 1, wherein the pore-former particle size distribution of the pore-former spheroidal particles comprises $DPb \leq 1.25$.

9. The batch mixture of claim 1, wherein the pore-former particle size distribution of the pore-former spheroidal particles comprises $(DP_{90}\text{-}DP_{10}) \leq 20$ µm.

10. The batch mixture of claim 1, wherein the pore-former spheroidal particles comprise between 5 wt % and 35 wt % by super-addition to a total weight of inorganics in the batch mixture.

11. The batch mixture of claim 1, comprising a weight of 22 wt % $\leq LV \leq 35$ wt % by super-addition to inorganics of the batch mixture, wherein LV is liquid vehicle, and the pore-former spheroidal particles are non-hydrophillic.

12. The batch of claim 1, wherein the pre-reacted inorganic particles comprise one or more crystalline phases and wherein the one or more crystalline phases comprise at least one of (i) aluminum titanate, (ii) feldspar, (iii) mullite, (iv) titania, (v) magnesia, (vi) alumina, (vii) magnesium dititanate, (viii) silicon carbide, (ix) pseudobrookite, (x) cordierite, (xi) cordierite, magnesia, aluminum titatnate composite, and (xii) combinations thereof.

13. The batch mixture of claim 1, wherein the pre-reacted inorganic particles comprise one or more crystalline phases and wherein the pre-reacted inorganic spheroidal particles comprise a first crystalline phase predominantly of a solid solution of aluminum titanate and magnesium dititanate, and a second crystalline phase comprising cordierite.

14. The batch mixture of claim 1, wherein the pre-reacted inorganic particles comprise one or more crystalline phases and wherein the pre-reacted inorganic spheroidal particles comprise a pseudobrookite crystalline phase comprising predominately alumina, magnesia, and titania, a second crystalline phase comprising cordierite, and a third crystalline phase comprising mullite.

15. A method of manufacturing a honeycomb body, comprising:

mixing a batch mixture comprising pre-reacted inorganic spheroidal particles, fine inorganic particles, organic binder, pore-former spheroidal particles, and a liquid vehicle to form a paste, wherein the pre-reacted inorganic spheroidal particles have a pre-reacted particle size distribution of:

10 µm $\leq DI_{50} \leq 50$ µm, and $DIb \leq 2.0$; and wherein the pore-former spheroidal particles having a pore-former particle size distribution of:

$0.40\ DI_{50} \leq DP_{50} \leq 0.90\ DI_{50}$, and $DPb \leq 1.32$, and wherein each of $DI_{90}$, $DI_{50}$, and $DI_{10}$ is a coarse particle diameter, a median particle diameter, or a fine particle diameter, respectively, of the pre-reacted particle size distribution of the pre-reacted inorganic spheroidal particles in which 90%, 50%, or 10%, respectively, of the pre-reacted inorganic spheroidal particles have a diameter that is equal to or less than the coarse particle diameter, the median particle diameter, or the fine particle diameter, each of $DP_{90}$, $DP_{50}$, $DP_{10}$ is a coarse particle diameter, a median particle diameter, or a fine particle diameter, respectively, of the pore-former particle size distribution of the pore-former spheroidal particles in which 90%, 50%, or 10%, respectively, of the pore-former spheroidal particles have a diameter that is equal to or less than the coarse particle diameter, the median particle diameter, or the fine particle diameter, respectively, DIb is a breadth factor of the pre-reacted particle size distribution of the pre-reacted inorganic spheroidal particles and $DIb=\{DI_{90}\text{-}DI_{10}\}/DI_{50}$, and DPb is a breadth factor of the pore-former particle size distribution of the pore-former spheroidal particles and $DPb=\{DP_{90}\text{-}DP_{10}\}/DP_{50}$; and wherein the fine inorganic particles comprise less than 20 wt % having a median particle diameter of less than 5 µm based on a total weight of the pre-reacted inorganic spheroidal particles; and forming the paste into a wet green honeycomb body.

16. The method of manufacturing of claim 15, comprising:

drying the wet green honeycomb body to form a dried green honeycomb body; and firing the dried green honeycomb body to form a porous ceramic honeycomb body.

* * * * *

UNITED STATES PATENT AND TRADEMARK OFFICE
CERTIFICATE OF CORRECTION

| | | |
|---|---|---|
| PATENT NO. | : 11,447,422 B2 | Page 1 of 1 |
| APPLICATION NO. | : 16/760145 | |
| DATED | : September 20, 2022 | |
| INVENTOR(S) | : Monika Backhaus-Ricoult et al. | |

It is certified that error appears in the above-identified patent and that said Letters Patent is hereby corrected as shown below:

On the Title Page

On the Page 3, item (56), in Column 2, under "Other Publications", Line 38, delete "alunimum" and insert -- aluminum --.

In the Claims

In Column 31, Line 14, in Claim 11, delete "non-hydrophillic." and insert -- non-hydrophilic. --.

In Column 31, Line 15, in Claim 12, insert -- mixture -- between the words "batch" and "of".

In Column 31, Line 21, in Claim 12, delete "titatnate" and insert -- titanate --.

Signed and Sealed this
Nineteenth Day of August, 2025

Coke Morgan Stewart
*Acting Director of the United States Patent and Trademark Office*